US008732480B2

(12) United States Patent
Hashimoto et al.

(10) Patent No.: US 8,732,480 B2
(45) Date of Patent: May 20, 2014

(54) MEMORY MANAGEMENT DEVICE AND MEMORY MANAGEMENT METHOD

(75) Inventors: Mikio Hashimoto, Tokyo (JP); Hiroyoshi Haruki, Kanagawa (JP); Takeshi Kawabata, Kanagawa (JP); Tomohide Jokan, Kanagawa (JP); Yurie Fujimatsu, Kanagawa (JP); Ryotaro Hayashi, Kanagawa (JP); Fukutomo Nakanishi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 221 days.

(21) Appl. No.: 13/223,753

(22) Filed: Sep. 1, 2011

(65) Prior Publication Data

US 2012/0079283 A1    Mar. 29, 2012

(30) Foreign Application Priority Data

Sep. 24, 2010    (JP) .................. 2010-214002

(51) Int. Cl.
*G06F 17/30* (2006.01)
(52) U.S. Cl.
USPC .............................. 713/189; 726/27
(58) Field of Classification Search
USPC ................... 713/164–167, 189–194
See application file for complete search history.

(56) References Cited

U.S. PATENT DOCUMENTS

| | | | |
|---|---|---|---|
| 5,224,160 A | | 6/1993 | Paulini et al. |
| 5,812,792 A | * | 9/1998 | Haddock et al. ............... 709/249 |
| 7,246,017 B2 | * | 7/2007 | Nakano ........................... 702/66 |
| 7,317,798 B2 | * | 1/2008 | Saito .............................. 380/277 |
| 7,415,729 B2 | * | 8/2008 | Ukeda et al. ..................... 726/26 |
| 7,484,116 B2 | * | 1/2009 | Brey et al. ....................... 714/6.1 |
| 7,681,050 B2 | * | 3/2010 | Blom et al. .................... 713/194 |

(Continued)

FOREIGN PATENT DOCUMENTS

| | | |
|---|---|---|
| JP | 2564593 | 10/1996 |
| JP | 2004-038968 | 2/2004 |

(Continued)

OTHER PUBLICATIONS

Rogers, et al. Using Address Independent Seed Encryption and Bonsai Merkle Trees to Make Secure Processors OS- and Performance-Friendly, 40th IEEE/ACM International Symposium on Microarchitecture, Dec. 2007, pp. 183-194.

(Continued)

*Primary Examiner* — Eleni Shiferaw
*Assistant Examiner* — Phy Anh Vu
(74) *Attorney, Agent, or Firm* — Amin, Turocy & Watson, LLP

(57) ABSTRACT

According to an embodiment, a memory management device increments a lower value of a first counter, updates the counter by incrementing an upper value and resetting the lower value when the lower value overflows, increments to update the lower counter value when the upper value is incremented as a result of writing a second data piece having the upper value in common to a memory, recalculates a first secret value calculated using the first counter values and a root secret value in response to the first counter update, writes a first data piece and the first secret value to the memory, and at reading of the first data piece and the first secret value, calculates a second secret value using the updated first counter values and the root secret value, and compares the first secret value with the second secret value to verify the first data piece.

10 Claims, 15 Drawing Sheets

(56) References Cited

U.S. PATENT DOCUMENTS

| | | | |
|---|---|---|---|
| 2002/0049964 A1* | 4/2002 | Takayama et al. | 717/154 |
| 2003/0188158 A1* | 10/2003 | Kocher | 713/161 |
| 2004/0006695 A1* | 1/2004 | Ishibashi et al. | 713/175 |
| 2005/0132186 A1* | 6/2005 | Khan et al. | 713/165 |
| 2005/0132226 A1* | 6/2005 | Wheeler et al. | 713/201 |
| 2005/0188218 A1* | 8/2005 | Walmsley et al. | 713/200 |
| 2006/0116969 A1* | 6/2006 | Hatanaka et al. | 705/71 |
| 2006/0268867 A1* | 11/2006 | Hashimoto et al. | 370/389 |
| 2007/0180464 A1* | 8/2007 | Dellow et al. | 725/31 |
| 2007/0276994 A1* | 11/2007 | Caulkins et al. | 711/113 |

FOREIGN PATENT DOCUMENTS

| | | |
|---|---|---|
| JP | 2006-203564 | 8/2006 |
| JP | 2008-140384 | 6/2008 |
| JP | 2009-003855 | 1/2009 |

OTHER PUBLICATIONS

Japanese Office Action for Japanese Application No. 2010-214002 mailed Aug. 21, 2012.

* cited by examiner

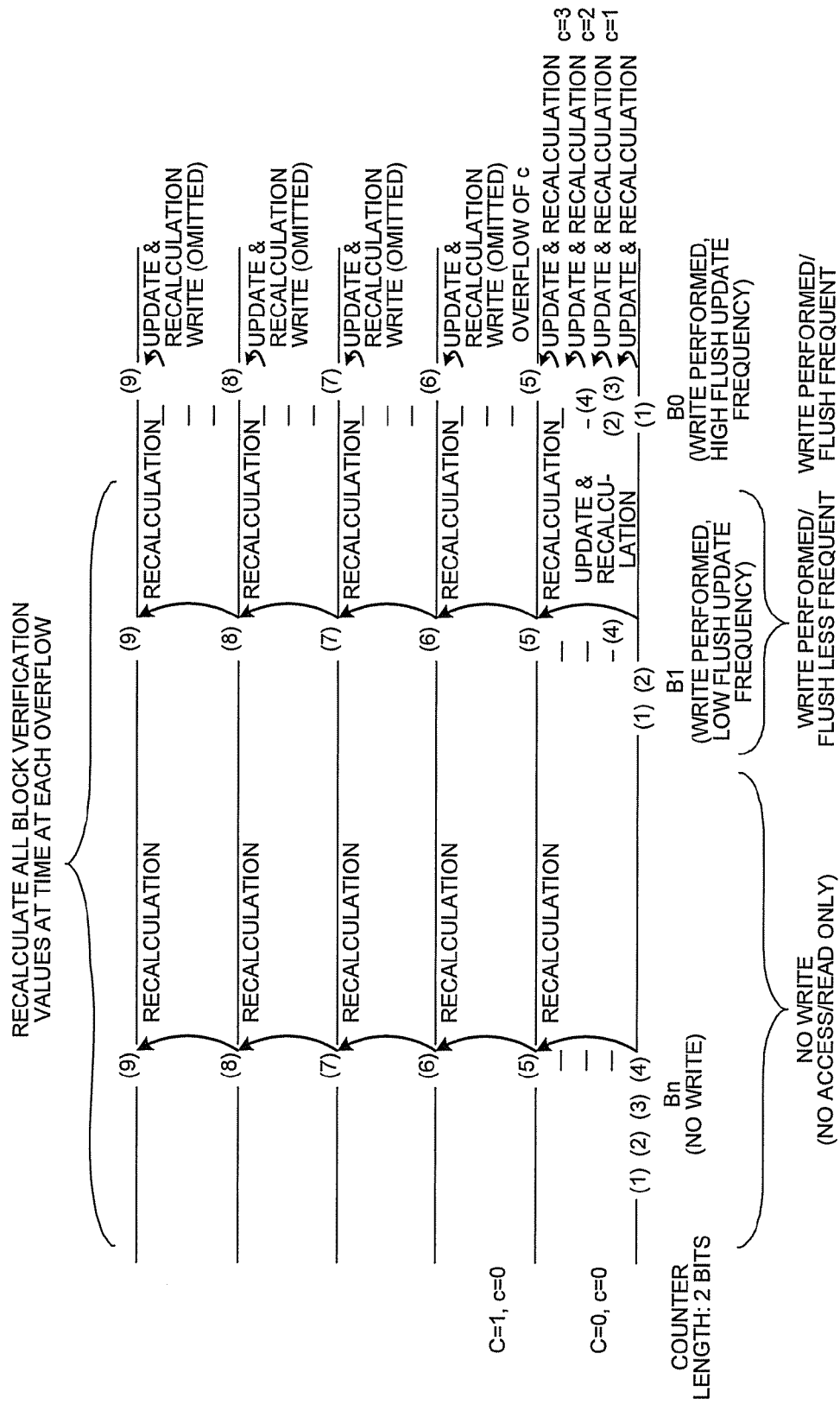

FIG.15

| | LINE 2 | | | | LINE 1 | | | | LINE 0 | | | |
|---|---|---|---|---|---|---|---|---|---|---|---|---|
| WRITE PRESENCE | READ ONLY | | | | WRITE PERFORMED | | | | HIGH WRITE FREQUENCY | | | |
| FLUSH FREQUENCY | NONE | | | | LOW FLUSH FREQUENCY | | | | HIGH FLUSH FREQUENCY | | | |
| | C | c | WF | FLUSH RECALCULATION | C | c | WF | FLUSH RECALCULATION | C | c | WF | FLUSH RECALCULATION |
| (1) | 0 | 0 | 0 | | 0 | 0 | 0 | | 0 | 0 | 0 | |
| (2) | 0 | 0 | 0 | | 0 | 0 | 0 | | 0 | 1 | 1 | ○ |
| (3) | 0 | 0 | 0 | | 0 | 1 | 1 | ○ | 0 | 1 | 1 | |
| (4) | 0 | 0 | 0 | | 0 | 1 | 1 | | 0 | 2 | 1 | ○ |
| 4+ | 0 | 0 | 0 | | 0 | 1 | 1 | | 0 | 3 | 1 | ○ |
| 4++ | | | | ○ (RELATED) | | | | ○ (RELATED) | 1 | O.F | CAUSE | ○ |
| (5) | 1 | 0 | 0 | | 1 | 0 | 0 | | 1 | 0 | 0 | |
| 5+ | 1 | 0 | 0 | | 1 | 0 | 0 | | 1 | 3 | 1 | ○×3 |
| 5++ | | | | ○ (RELATED) | | | | ○ (RELATED) | 2 | O.F | CAUSE | ○ |
| (6) | 2 | 0 | 0 | | 2 | 0 | 0 | | 2 | 0 | 0 | |
| 6+ | 2 | 0 | 0 | | 2 | 0 | 0 | | 2 | 3 | 1 | ○×3 |
| 6++ | | | | ○ (RELATED) | | | | ○ (RELATED) | 3 | O.F | CAUSE | ○ |
| (7) | 3 | 0 | 0 | | 3 | 0 | 0 | | 3 | 0 | 0 | |
| 7+ | 3 | 0 | 0 | | 3 | 0 | 0 | | 2 | 3 | 1 | ○×3 |
| 7++ | | | | ○ (RELATED) | | | | ○ (RELATED) | 4 | O.F | CAUSE | ○ |
| (8) | 4 | 0 | 0 | | 4 | 0 | 0 | | 4 | 0 | 0 | |
| 8+ | 4 | 0 | 0 | | 4 | 0 | 0 | | 3 | 3 | 1 | ○×3 |
| 8++ | | | | | | O.F | | | | O.F | CAUSE | ○ |
| (9) | 4 | 0 | 0 | | 5 | 0 | 0 | | 5 | 0 | 0 | |

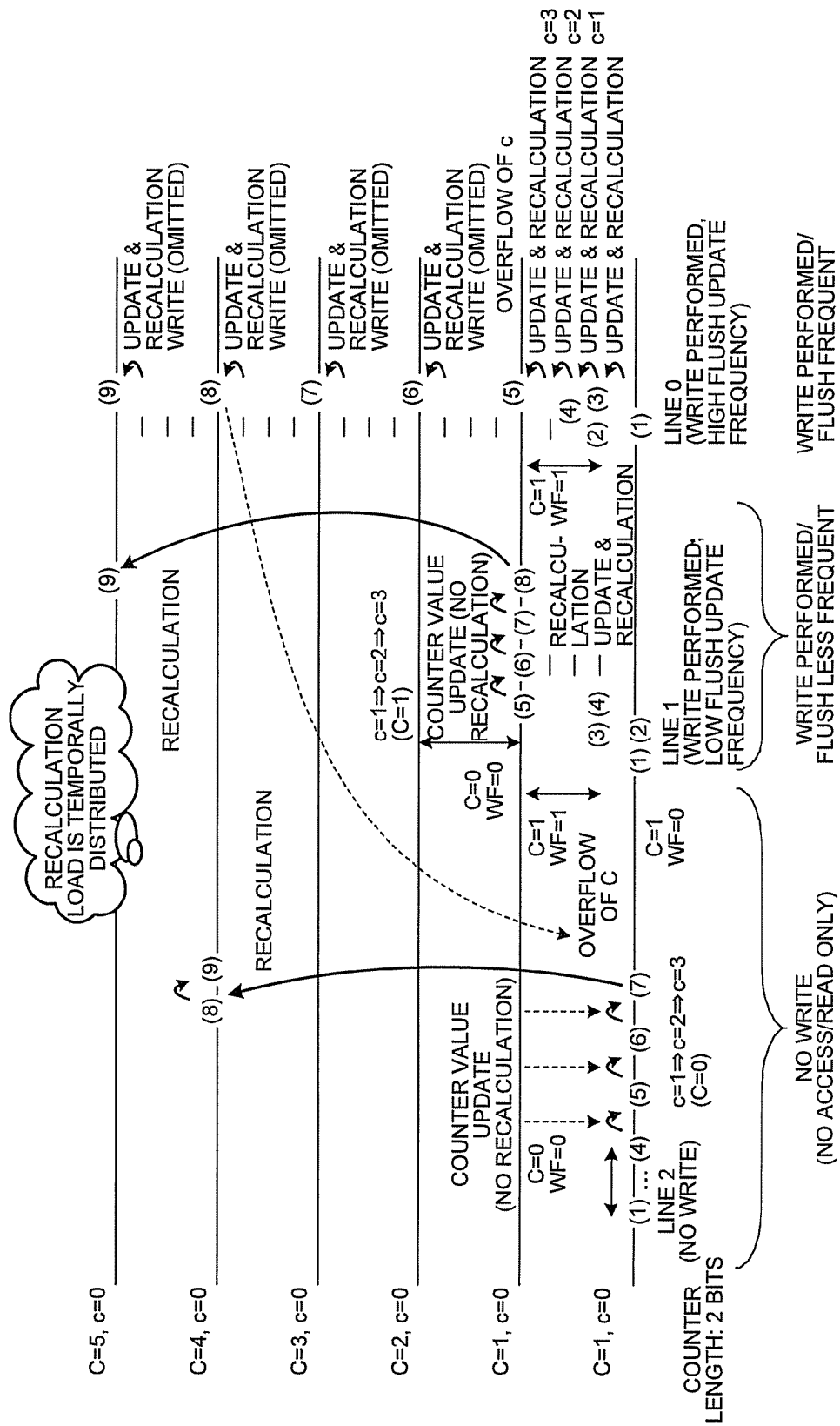

FIG.17

| WRITE PRESENCE | LINE 2 READ ONLY | | | | LINE 1 WRITE PERFORMED | | | | LINE 0 HIGH WRITE FREQUENCY | | | |
|---|---|---|---|---|---|---|---|---|---|---|---|---|
| FLUSH FREQUENCY | NONE | | | | LOW FLUSH FREQUENCY | | | | HIGH FLUSH FREQUENCY | | | |
|  | C | c | WF | FLUSH RECALCULATION | C | c | WF | FLUSH RECALCULATION | C | c | WF | FLUSH RECALCULATION |
| (1) | 0 | 0 | 0 |  | 0 | 0 | 0 |  | 0 | 0 | 0 |  |
| (2) | 0 | 0 | 0 |  | 0 | 0 | 0 |  | 0 | 1 | 1 | O |
| (3) | 0 | 0 | 0 |  | 0 | 1 | 1 | O | 0 | 1 | 1 |  |
| (4) | 0 | 0 | 0 |  | 0 | 1 | 1 |  | 0 | 2 | 1 | O |
| 4+ | 0 | 0 | 0 |  | 0 | 1 | 1 |  | 0 | 3 | 1 | O |
| 4++ |  |  |  |  |  |  |  | O (RELATED) | O.F CAUSE |  |  | O |
| (5) | 0 | 1 | 0 |  | 1 | 0 | 0 |  | 1 | 0 | 0 |  |
| 5+ | 0 | 1 | 0 |  | 1 | 0 | 0 |  | 1 | 3 | 1 | O×3 |
| 5++ |  |  |  |  |  |  |  |  | O.F CAUSE |  |  | O |
| (6) | 0 | 2 | 0 |  | 1 | 1 | 0 |  | 2 | 0 | 0 |  |
| 6+ | 0 | 2 | 0 |  | 1 | 1 | 0 |  | 2 | 3 | 1 | O×3 |
| 6++ |  |  |  |  |  |  |  |  | O.F CAUSE |  |  | O |
| (7) | 0 | 3 | 0 |  | 1 | 2 | 0 |  | 3 | 0 | 0 |  |
| 7+ | 0 | 3 | 0 |  | 1 | 2 | 0 |  | 2 | 3 | 1 | O×3 |
| 7++ | O.F |  |  | O (RELATED) |  |  |  |  | O.F CAUSE |  |  | O |
| (8) | 4 | 0 | 0 |  | 1 | 3 | 0 |  | 4 | 0 | 1 |  |
| 8+ | 4 | 0 | 0 |  |  | 3 | 0 |  |  | 3 | 1 | O×3 |
| 8++ |  |  |  |  | O.F |  |  | O (RELATED) | O.F CAUSE |  |  | O |
| (9) | 4 | 1 | 0 |  | 5 | 0 | 0 |  | 5 | 0 | 0 |  |

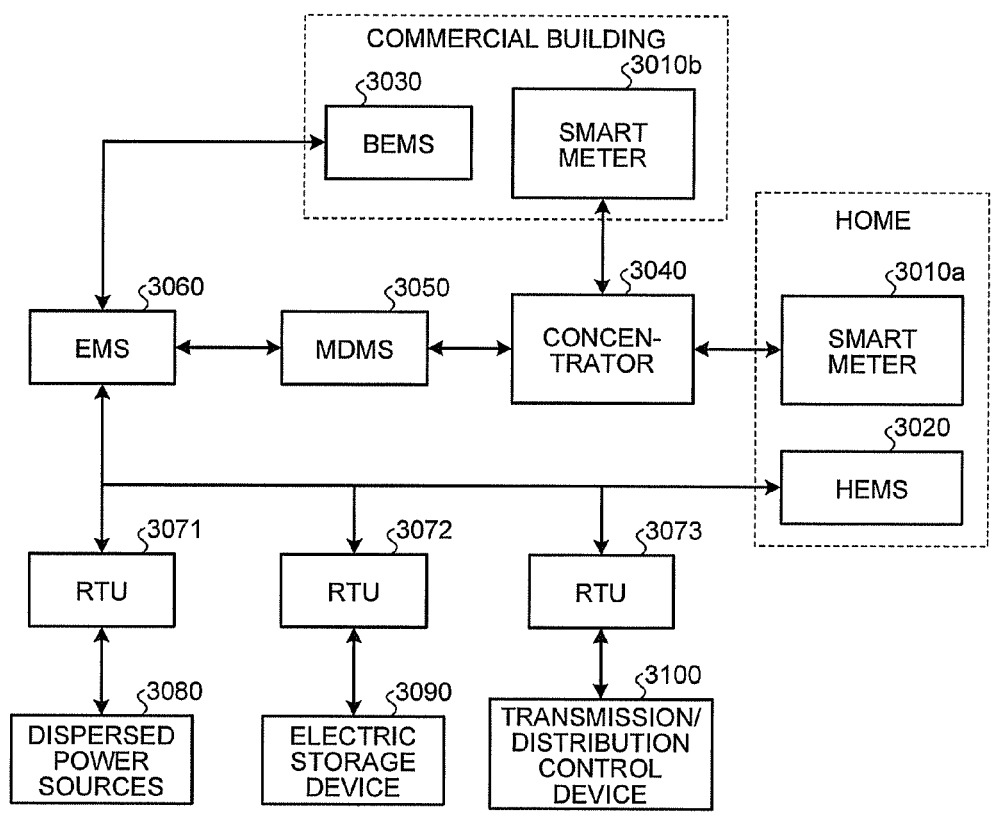

MEMORY MANAGEMENT DEVICE AND MEMORY MANAGEMENT METHOD

CROSS-REFERENCE TO RELATED APPLICATION(S)

This application is based upon and claims the benefit of priority from Japanese Patent Application No. 2010-214002, filed on Sep. 24, 2010; the entire contents of which are incorporated herein by reference.

FIELD

Embodiments described herein relate generally to a memory management device and a memory management method.

BACKGROUND

In countermeasures against tampering attacks, particularly replay attacks, on a large-capacity memory located off-chip (off-chip memory) and connected to a processor, security information necessary for integrity verification for blocks (memory blocks) constituting the memory (referred to as memory integrity verification) need to be derived from limited amount of on-chip security information for each memory block and for each rewritten version. As an approach to this issue, there is proposed a method called a Bonsai Merkle Tree (Rogers, 2007) in which a secret key for integrity verification used in calculation of a MAC verification value is generated based on a unique identifier for each data block and hierarchical counter values, and security information is managed efficiently by limiting the objects of integrity verification to the counter values and data.

In a case where counter values protected against tampering using a tree is applied to memory protection, if the number of writes to off-chip memory of memory blocks to be protected exceeds the size of a lower counter and the lower counter overflows, a counter value of an upper counter (upper counter value) under a parent block of the hierarchical tree has to be updated (incremented) and a MAC verification value has to be recalculated simultaneously for all data blocks having the upper counter value in common. This may cause degradation in throughput and responsiveness of the memory system. If, on the other hand, the size of counters is increased, the number of levels of a tree to be protected is increased exponentially, which may result in reduction in space efficiency of the memory.

BRIEF DESCRIPTION OF THE DRAWINGS

FIG. 14 is a diagram illustrating an outline of procedures of counter value update and MAC calculation according to the conventional technology;

FIG. 15 is a table showing states in corresponding procedures illustrated in FIG. 14;

FIG. 16 is a diagram illustrating an outline of procedures of counter value, update and MAC calculation according to the embodiment;

FIG. 17 is a table showing states in corresponding procedures illustrated in FIG. 16; and FIG. 18 is a diagram illustrating a configuration of a next-generation power grid according to an example of application of the embodiment.

DETAILED DESCRIPTION

Figure 1:
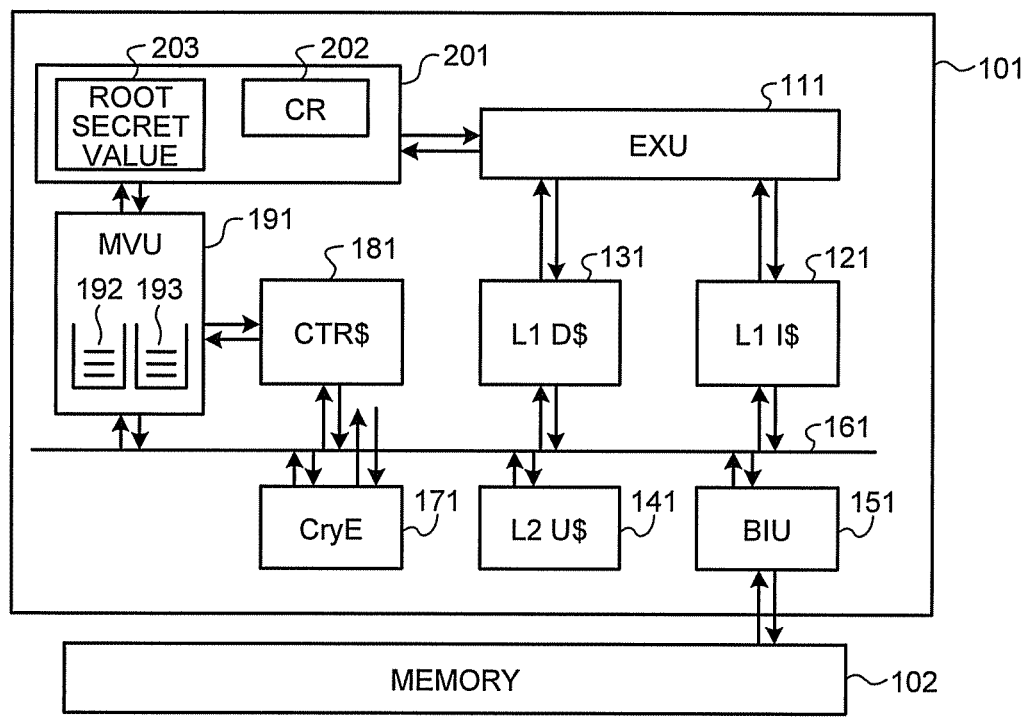
FIG. 1 is a diagram illustrating a hardware configuration of a microprocessor according to an embodiment.

According to an embodiment, a memory management device, to which a memory is connected and which performs verification at reading of data stored in the memory and at writing of data to the memory, includes a first storage unit configured to store therein a root secret value that is a secret value assigned to the memory; a second storage unit configured to hold an upper counter value that is in common among a predetermined plurality of data pieces and lower counter values associated with the data pieces, respectively; an assignment unit configured to update counter values including the upper counter value and the lower counter values at writing of the data pieces to the memory and calculate data verification values; and a verification unit configured to performs a verification process of the data verification values at reading of the data pieces. At writing of first data piece to the memory: the assignment unit increments a lower counter value associated with the first data piece each time the number of times the first data piece is written to the memory is increased; when the lower counter value associated with the first data piece overflows, the assignment unit updates counter values associated with the first data piece by incrementing the upper counter value in common among the plurality of data pieces and resetting the lower counter value; the assignment unit calculates a first secret value for each data piece using the counter values associated with the first data piece and the root secret value, and calculates a first data verification value using the first data piece and the first secret value for each data piece; when the counter values associated with the first data piece are updated, the assignment unit recalculates the first secret value for each data piece using the updated counter values and the root secret value, and recalculates the first data verification value using the first data piece and the first secret value for each data piece; and the assignment unit writes the first data piece and the calculated first data verification value or the recalculated first data verification value to the memory. At reading of the first data piece from the memory: the verification unit reads the first data piece and the first data verification value from the memory; when the first data piece and the first data verification value are read, the verification unit calculates a second secret value for each data piece using updated values of the counter values associated with the first data piece and the root secret value, and calculates a second data verification value using the read first data piece and the second secret value for each data piece; and the verification unit compares the read first data verification value and the second data verification value to perform verification of the read first data piece. At writing of second data piece to the memory: when a lower counter value associated with the second data piece overflows, the assignment unit updates counter values associated with the second data piece by incrementing the upper counter value in common among the plurality of data pieces and resetting the lower counter value; the assignment unit calculates the first secret value for each data piece using the counter values associated with the second data piece and the root secret value, and calculates a second data verification value using the second data piece and the first secret value for each data piece; when the counter values associated with the second data piece are updated, the assignment unit recalculates the first secret value for each data piece using the updated counter values and the root secret value, and recalculates the first data verification value using the second data piece and the first secret value for each data piece; the assignment unit writes the second data piece and the calculated second data verification value or the recalculated first data verification value to the memory; when the lower counter value associated with the first data piece overflows as a result of incrementing the upper counter value, the assignment unit updates the counter values associated with the first data piece by resetting the lower counter value; the assignment unit calculates the first secret value for each data piece using the counter values associated with the first data piece and the root secret value, and calculates the first data verification value using the first data piece and the first secret value for each data piece; when the counter values associated with the first data piece are updated, the assignment unit recalculates the first secret value for each data piece using the updated counter values and the root secret value, and recalculates the first data verification value using the first data piece and the first secret value for each data piece; and the assignment unit writes the calculated first data verification value or the recalculated first data verification value to the memory.

Various embodiments will be described hereinafter with reference to the accompanying drawings.

First, the background of the embodiment will be described. There are various malicious manipulation attacks on data stored in memories. One object of the embodiment is to achieve means for countering such malicious manipulation attacks on data in a large-scale memory system that are difficult to be stored entirely in a processor technically and in terms of cost. A memory system includes a processor and a memory. In the memory system, storage (writing) and reading of data to/from the memory are controlled by the processor. For example, the embodiment is achieved in the context that means for reducing a current risk having a great major impact has been desired. One example of such memories may be a database of behavior rules for an autonomous mobile robot used for in-home and out-of-home care support. Support for a human requires an extensive rule base and real-time response so as to select a behavior suitable for each situation. If such a database is altered by a malicious manipulation attack or a malicious program called malware, serious harm to human life may be caused. An on-chip memory of a central processing unit (CPU) is most secure only for the purpose of preventing malicious alteration of a memory. However, when a larger memory capacity is required, an on-chip memory is likely to be expensive in cost as compared to a memory located on a separate chip even if a chip stacking technology or the like is applied. An object of the embodiment is to provide practically an equal level of security to data stored in a large-scale memory located outside of a CPU as compared to a memory embedded in a CPU by applying a cryptographic technology thereto.

The embodiment will be described hereinafter referring to a cache memory from/to which data are read and written in units of a cache line as an example. FIG. 1 is a diagram illustrating a hardware configuration of a microprocessor to which a memory management device according to the embodiment is applied. A microprocessor 101 is connected to an external memory (Ext. Memory) 102. The microprocessor 101 and the external memory 102 in combination are referred to as a memory system. For example, the memory system may be constituted by the microprocessor 101 as a main board of a computer system and the external memory 102 as a secondary storage device such as a hard disk.

The microprocessor 101 includes an EXU 111, an L1 instruction cache (L1I$) 121, an L1 data cache (L1D$) 131, an L2 cache (L2U$) 141, a BIU 151, an internal bus 161, a dedicated hardware encryption engine (CryE) 171, a counter cache (CTR$) 181, a memory verification unit (MVU) 191 and a control register 201. The BIU 151 is configured to control reading of data from the external memory 102 and writing of data to the external memory 102. The EXU 111 is a processor configured to execute instructions. The L2 cache 141 is a cache memory configured to store data read from the external memory 102. The L1 data cache 131 is a cache memory configured to store data read from the external memory 102 and stored in the L2 cache 141. The L1 instruction cache 121 is a cache memory configured to store instructions executed by the EXU 111. The counter cache 181 is a cache memory configured to store counter values. The MVU 191 includes a verification target address stack (verification stack) 192 and a MAC value stack (MAC stack) 193, and is configured to perform hierarchical tampering verification, which will be described later, on reading of data stored in the external memory 102 and writing of data to the external memory 102 by using counter values stored in the counter cache 181. The dedicated hardware encryption engine 171 performs MAC calculation in response to a request from the MVU 191 when the MVU 191 performs tampering verification. The control register 201 is a storage holding a group of registers for controlling operations of the microprocessor, and the values of the registers can be set by the EXU 111. The control register 201 includes a general purpose control register (CR) 202 and is configured to store a root secret value 203 which will be described later.

Next, a method for calculating the memory integrity verification that is a basis of the embodiment will be described. The memory integrity verification in the embodiment is tampering verification for detecting tampering of data. Herein, data that are written to the external memory 102 by the microprocessor 101 and have values that are different when read from those when written are defined as being tampered. Even if data in the external memory 102 located outside of the microprocessor 101 are altered, the microprocessor 101 cannot detect the alteration at that point. The detection of tampering is defined by determining whether data are tampered using a cryptographic method the next time when the data in the external memory 102 are referred to. A similar definition is used in Rogers mentioned above. The microprocessor 101 does not hold previously written data directly in the same format for comparison in the tampering detection, but holds therein only a compressed value called a MAC verification value (data verification value) and counters necessary for MAC calculation so as to keep the size of the memory such as a cache memory built in the microprocessor 101 small. The MAC verification value will be hereinafter referred to simply as a MAC value or a MAC for convenience of description.

Figure 2:
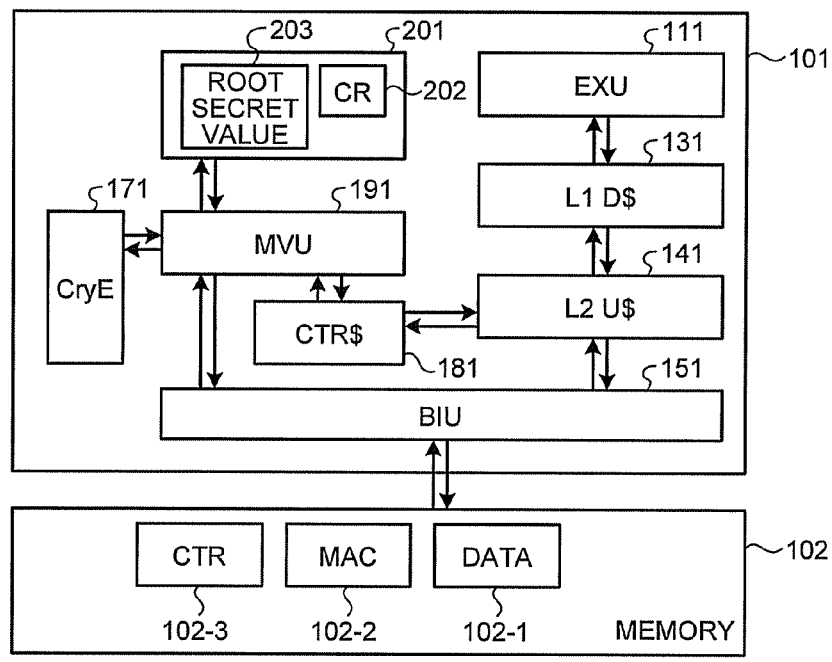
FIG. 2 is a diagram illustrating a hardware configuration in relation to memory integrity verification.

FIG. 2 is a diagram illustrating a configuration of the microprocessor 101 in relation to the memory integrity verification according to the embodiment. As illustrated in FIG. 2, data 102-1, a MAC 102-2 and a counter (CTR) 102-3 are stored as information in the external memory 102.

The following expressions based on the Verilog are used below to describe bit manipulation in calculation for the memory integrity verification.

X[63:6]: a range from 63rd bit to 6th bit of a value X; the LSB is bit 0.

X||Y: connected bits of X and Y

The following expressions are used to describe cryptographic calculation.

Y=E_S[X]: Y is calculated by AES common key block encryption of X using a secret key S; all the data sizes of S, X and Y are equal to the block length; in the following description, AES-128 with a block length of 128 bits (16 bytes) will be taken as an example; however, other cryptographic algorithms may be used.

Z=MAC_S[D0 . . . D3]: a common key block-based fixed-length CMAC algorithm based on the secret key S is applied to four data blocks D0, D1, D2 and D3 each of which has a common key block size to obtain a MAC value Z; the data sizes of Z and S are also equal to the common key block length; on the assumption that the MAC is applied in units of a cache line of 64 bytes (cache line size), the MAC of 64 byte-data including four 16 byte-data blocks is calculated.

Parameters are as follows.

RS (203-3): Root Secret; a secret value (root secret value) used in common in the entire memory area of the external memory 102 and assigned to the external memory 102; this value is always held in the microprocessor 101.

Addr: a beginning address of a verification target block in a cache line; bit width is 64 bits; in the embodiment, the lower four bits (Addr[3:0]) are always "0" because the block length for the cryptographic calculation is 16 bytes. D(Addr)[c]: data (D0 . . . D3) having Addr as the beginning address and a cache line size; c is incremented each time the number of times data at a location indicated by the address are written by the microprocessor 101 is increased.

Cm: minor counter (lower counter); a counter value defined for each cache line; Cm associated with the beginning address Addr of a verification target cache line is expressed by Cm(Addr); Cm is incremented at each writing of D(Addr); the initial value is "0".

CM: major counter (upper counter); a counter value in common among a plurality of cache lines; 62-bit wide; CM associated with the beginning address Addr of a verification target cache line is expressed by CM(Addr); CM is incremented at each overflow of Cm; the initial value is "0".

Sd: seed value for each line; 128-bit wide.

$$Sd=Addr[63:4]||CM||Cm \quad (1)$$

It is to be noted that the calculation formula (1) of the seed value is described in the known technique of Rogers, and the calculation formula (1) and another calculation formula will be used in combination in the embodiment described below.

The address and the value of the MAC (MAC value) V for a cache line X at an address Addr is calculated by the following formula (2) using a secret value for each block S[Addr,c]. S[Addr,c]=E_RS[Sd]=E_RS[Addr[63:4]||CM[60:0]||Cm[6:0]: secret value for each block $$V[D(Addr)[c]]=MAC\_S[D(Addr)[c]] \quad (2)$$

where c=CM[60:0]||Cm[6:0].

When the MAC value is calculated using the formula (2), it is clear from the definition that secret keys Sd used for derivation of the MAC values in the microprocessor 101 never coincides with one another among the addresses Addr for respective blocks of all cache lines and the number of writes c. The number of writes c of certain data is equal to CM||Cm. A result of encrypting an address Addr unique to each block and a connected value of CM||Cm by a root secret key RS is a MAC secret key S updated at each write for each block. Since Addr and CM||Cm are unique in the memory system according to the embodiment and the AES block encryption is bijective as a function, it is also ensured that S is unique.

Figure 3:
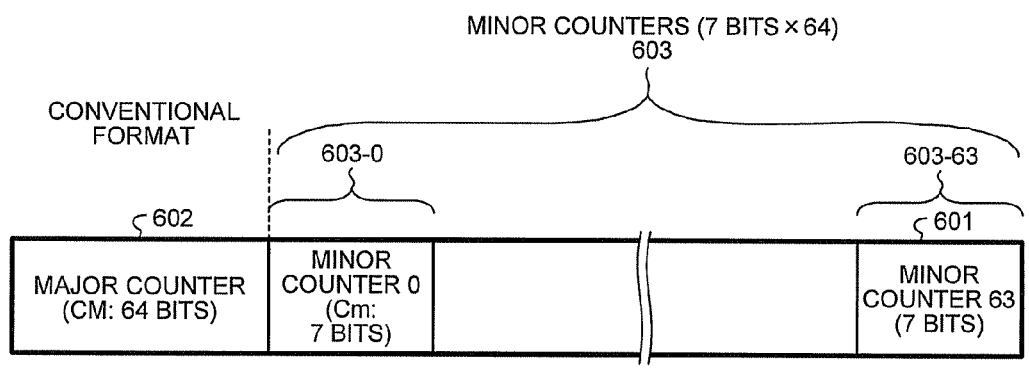
FIG. 3 is a diagram illustrating a storage format of counter values in an external memory according to a conventional method.

If the secret key S properly has uniqueness, both of Data (Addr)[c] and the verification value V[Data(Addr)[c]] are safe to be stored in the external memory 102 that may be tampered. This is because S used for generation of the verification value V[Data(Addr)[c] for Data(Addr)[c] with the secret key RS is used only once and a different S[Addr,c] is used for MAC value calculation for other data. To ensure the uniqueness, however, it is necessary that the above-described procedure be successfully carried out and the counter value be properly incremented at each data write. It is safe if all of the processes and parameters are stored in the microprocessor 101, but it is difficult to store all the counter values in the microprocessor 101 if the memory area to be verified is very large. FIG. 3 is a diagram illustrating a storage format of counter values according to a conventional method. As illustrated in FIG. 3, if 60 bits are assigned to CM and 7 bits are assigned to Cm, a memory size of 1/64 of the verification target will be required.

Therefore, in the embodiment, tampering verification using MACs is also applied to a cache line (counter line) where counter values are stored in a manner similar to data, and hierarchized. As a result, the size of data that have to be fixedly held in the microprocessor 101 is kept small no matter how large a memory area is subjected to tampering verification.

The following is applied to the tampering verification of data stored in the external memory 102 using a root secret value held in the microprocessor 101.

RS (203-1): common

Root MAC (203-2): a secret value that is a MAC value of 128 bits; this value is always held in the microprocessor 101.

The total size of the secret values is about 32 bytes that is a sum of Root MAC (128 bits) and Root Secret (128 bits), which is much smaller than that of the verification target as will be described later.

Figure 4:
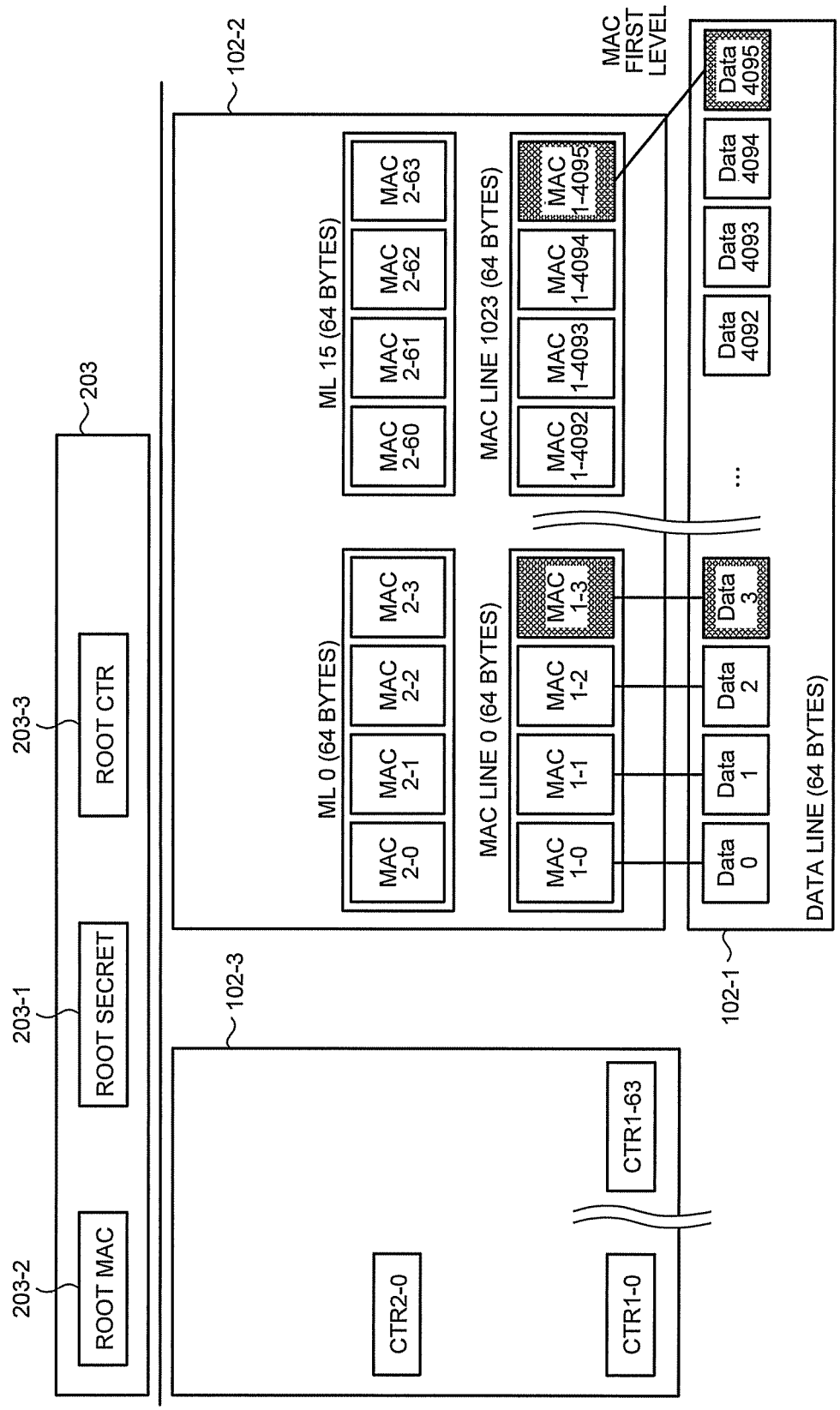
FIG. 4 is a diagram illustrating a data structure for verification according to the embodiment.

The outline of the structure of data for verification and storage formats in the external memory 102 and the microprocessor 101 will be described referring to FIGS. 3 to 6 before describing the procedure of hierarchical tampering verification in more detail. FIG. 4 is a diagram illustrating a data structure for verification. A root secret value 203 is held in the microprocessor 101 as already described above and includes Root Secret 203-1, Root MAC 203-2 and Root CTR 203-3. Verification target data 102-1 include Data0 to Data4095 associated with 4,096 64-byte cache lines. The data structure also includes MACs 102-2 and counter values (CTR) 102-3. The values are configured hierarchically. An example of two levels of set membership is presented herein.

As mentioned in the above description of the calculation method for memory integrity verification, the MAC for 64 bytes of verification target data is 16 bytes. The MAC associated with Data0 is MAC0-0, and four blocks of data MAC0-0 to MAC0-3 are stored in one cache line (MAC line ML0). A counter value is necessary for calculating a MAC from data.

Figure 5:
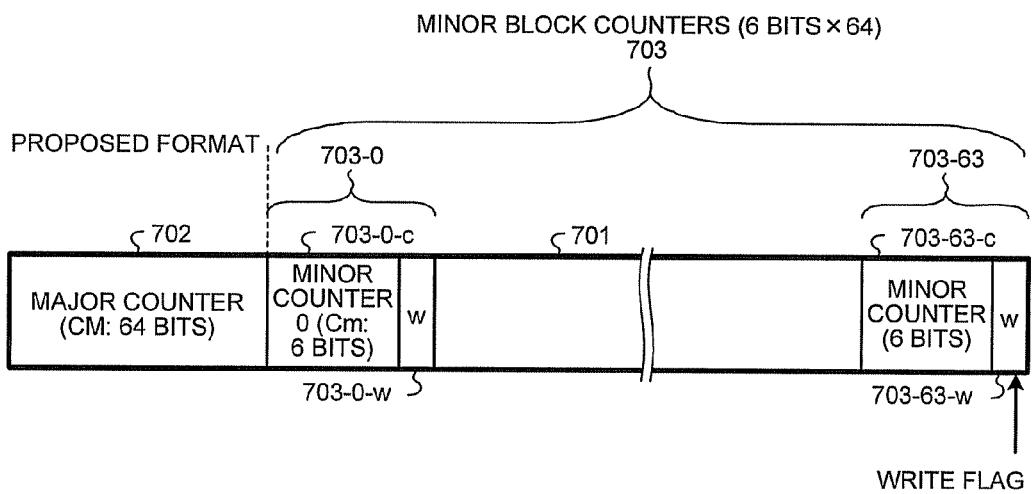
FIG. 5 is a diagram illustrating a storage format of counter values in the external memory according to the embodiment.

As illustrated in FIG. 4, counter values necessary for calculating MAC values on MAC lines ML0 to ML16 are stored in one counter line CTR1-0. FIG. 5 is a diagram illustrating a storage format of counter values in the external memory 102 according to the embodiment. Although there is a little difference between the storage format according to the embodiment illustrated in FIG. 5 and the above-described storage format according to the conventional method illustrated in FIG. 3, the counter line CTR1-0 holds a 64-bit upper counter (major counter 602 or 702) in common and holds 64 lower counters (minor counters 603-0 to 603-63 or 703-0 to 703-63) associated with MAC lines MAC0-0 to MAC1-63, respectively. In calculation of MAC values of four MAC blocks (MAC1-0 to MAC1-3) stored in the MAC line (ML0), the same upper counter value and the same lower counter value are used but the seed values of the respective MAC blocks in the MAC calculation are different because the blocks have different addresses. Thus, even if data replacement attack between blocks is made, such a replacement can be detected. In either case, the storage format has a hierarchical structure where the lower counters having the upper counter in common are combined. It is to be noted that while each of the counter values in the lower counters is expressed by 7 bits in the conventional method, each of the counter values in the lower counters 703-0 to 703-63 is expressed by 6 bits (703-0-c to 703-63-c), and the remaining 1 bit is a write flag (703-0-w to 703-63-w), which will be described later, in the embodiment.

In order to verify a cache line (data line) in which 4,096 data pieces are stored, 1,024 MAC lines (MAC1-0 to MAC1-1023) and 64 counter lines (CTR1-0 to CTR1-63) are needed in the first level. The MACs and the CTR in the second level are further provided so as to prevent tampering of the counter lines in the first level. MAC values associated with CTR1-0 to CTR1-63 are stored in MAC2-0 to MAC2-15, and the counter values necessary for MAC calculation are stored in CTR2-0. In this case, 16 MAC lines in which the MACs are stored and 1 counter line in which counter values are stored are used. Finally, a MAC associated with 1 counter line of CTR2-0 is stored in Root MAC inside the microprocessor 101. Since the Root MAC cannot be tampered or intercepted externally, a counter therefor is not needed.

Although a hierarchy of two levels is employed and the size of data to be verified (verification target data) is "4096× 64=256" KB in the embodiment, data within any range can be verification target by increasing the number of levels.

The data, MACs and counters described above are stored in the external memory 102. Once the address of verification target data (verification target address) is determined, the addresses of the counter line where the upper counter value necessary for verification thereof and the MAC line where the MAC is stored can be uniquely determined. More specifically, the register 202 in FIG. 1 is used as a control register, and a range of the verification target address (verification target address range), the beginning addresses of the counters and the MACs are stored in the register 202. The MVU 191 performs tampering verification by calculating the addresses.

Figure 6:
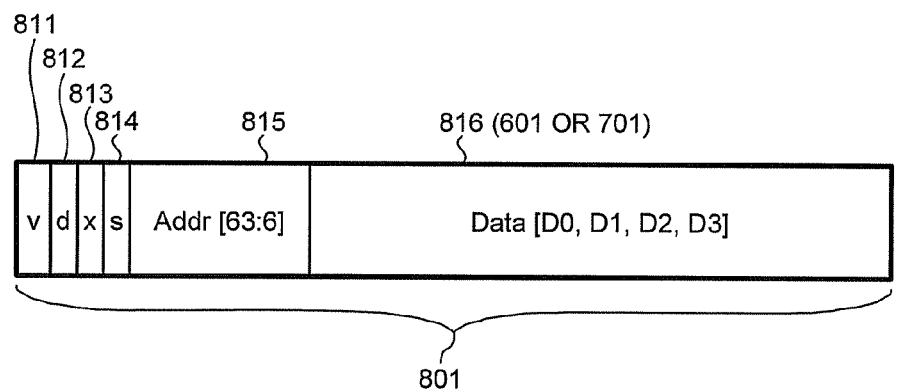
FIG. 6 is a diagram illustrating a data format in a cache according to the embodiment.

Data and counter values are stored in the cache memory inside the microprocessor 101. Specifically, the data are stored in at least one of the L1 data cache 131 and the L2 cache 141, and the counter values are stored in the counter cache 181. Typically, control data called a tag is added to a cache that is information stored in a cache memory. FIG. 6 is a diagram illustrating a data format of a cache. In data 816, data or the content of the counter line 601 in FIG. 3 or the counter line 701 in FIG. 5 are stored. A v-bit (valid bit) 811 indicates whether the cache line is valid. A writing flag 812 is a d-bit (dirty bit) indicating whether data are altered after reading of the cache line. If the d-bit is "1", data have been written and need to be written back to the external memory 102 in the cache line flush. These are typical control bits. A verification target flag 813 is an x-bit (eXamine bit) indicating whether data or a counter value stored in the cache line are verification target data. A verified flag 814 is an s-bit (status bit) indicating that verification target data stored in the cache line, if any, are in a state where the tampering verification thereof is completed. This is to prevent access to data stored in the cache memory after data storage is completed but before tampering verification thereof is completed owing to the fact that hierarchical tampering verification takes time. These two fields are bits involved in the tampering verification of the embodiment.

Here, the write flag mentioned above will be described. The initial value of the write flag is "0". If cache lines (called data lines) in which data associated with a MAC line and counters are stored are read by the counter cache 181 and the L2 cache 141, respectively, and if data are written to the data line in this state (after data are written to a certain cache line in the L1 data cache 131 by the BIU 151 and when the cache line is flushed from the L1 data cache 131 and included in the L2 cache 141), the dirty bit of the writing flag 812 of the data line 801 and the write flag 703-x-w (x=0 to 63) of the counter associated with the cache line is set to "1". It is to be noted that while the writing flag 812 is not written to the external memory 102 even when the cache line is flushed since the writing flag 812 is a tag, the write flag 703-x-w of the counter is written together with other information to the external memory 102 outside of the microprocessor 101 when the cache line is flushed.

Figure 7:
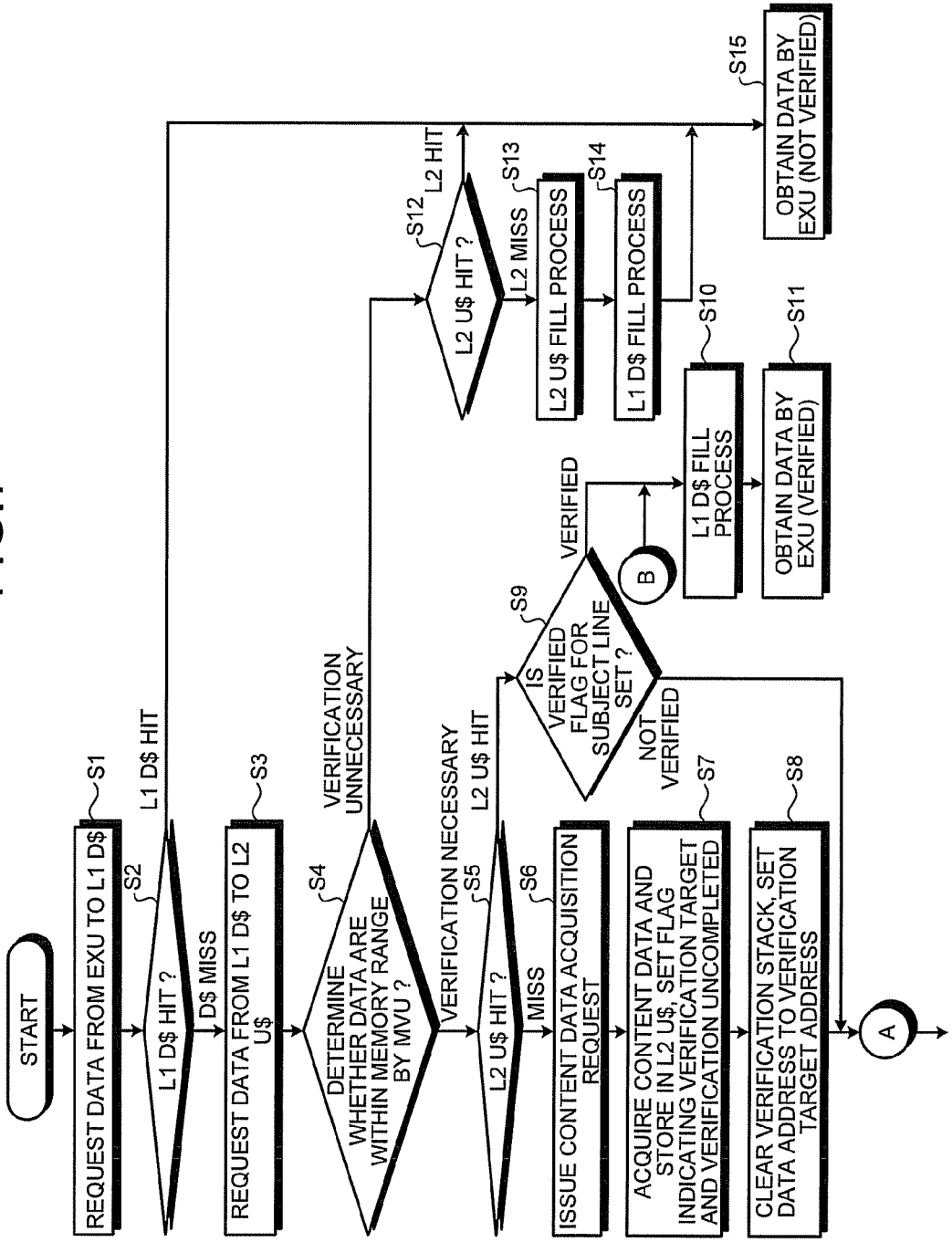
FIG. 7 is a flowchart illustrating an outline of operations in a case where a BMT method is applied to a cache memory.

Next, the outline of operations in a case where a memory verification scheme (BMT scheme) on which the memory integrity verification according to the embodiment is based is applied to the cache memory will be described referring to FIG. 7. The outline of a procedure described here is in a case where the data 102-1, the MAC 102-2 and the counter (CTR) 102-3 are stored as information in the external memory 102 as illustrated in FIG. 2, both the L1 data cache 131 and the L2 cache 141 hold no data to be accessed, which results in cache misses, and tampering verification is performed at reading of data from the external memory 102. In this case, as illustrated in FIG. 7, when the EXU 111 first issues a read request of data at an address Addr to the L1 data cache 131 (step S1), a cache miss occurs at the L1 data cache 131 (D$ MISS in step S2), and the L1 data cache 131 issues a read request of data at the address Addr to the L2 cache 141 (step S3). Meanwhile, the MVU 191 detects that the address Addr of data for which the data read request is issued from the L1 data cache 131 to the L2 cache 141 is within the verification target address range set in the requested CR 202 by monitoring the internal bus 161 (step S4). After step S3, a cache miss also occurs at the L2 cache 141 (MISS in step S5), and the L2 cache 141 issues a read request of data at the address Addr to the BIU 151 (step S6).

Subsequently, the BIU 151 reads data at the address Addr from the external memory 102 to acquire content data, and stores the content data in the L2 cache 141. The BIU 151 sets a control flag of a data line to which the data are stored to a flag indicating that the data are a verification target and that verification thereof is not completed (step S7). Specifically, the BIU 151 sets the x-bit to "1" and the s-bit to "0". Then, the BIU 151 clears the verification stack 192 and sets the verification target address for the next tampering verification to the address Addr (step S8). Then, data read is performed on the L2 cache 141 and the counter cache 181 and the hierarchical tampering verification using MACs is performed on the read data in steps S20 to S33. A detailed procedure of the hierarchical tampering verification will be described later. After the tampering verification, a fill process in which data are read from the L2 cache 141 to the L1 data cache 131 is performed in step S10. Then, the EXU 111 obtains verified data from the L1 data cache 131 in step S11.

Figure 8:
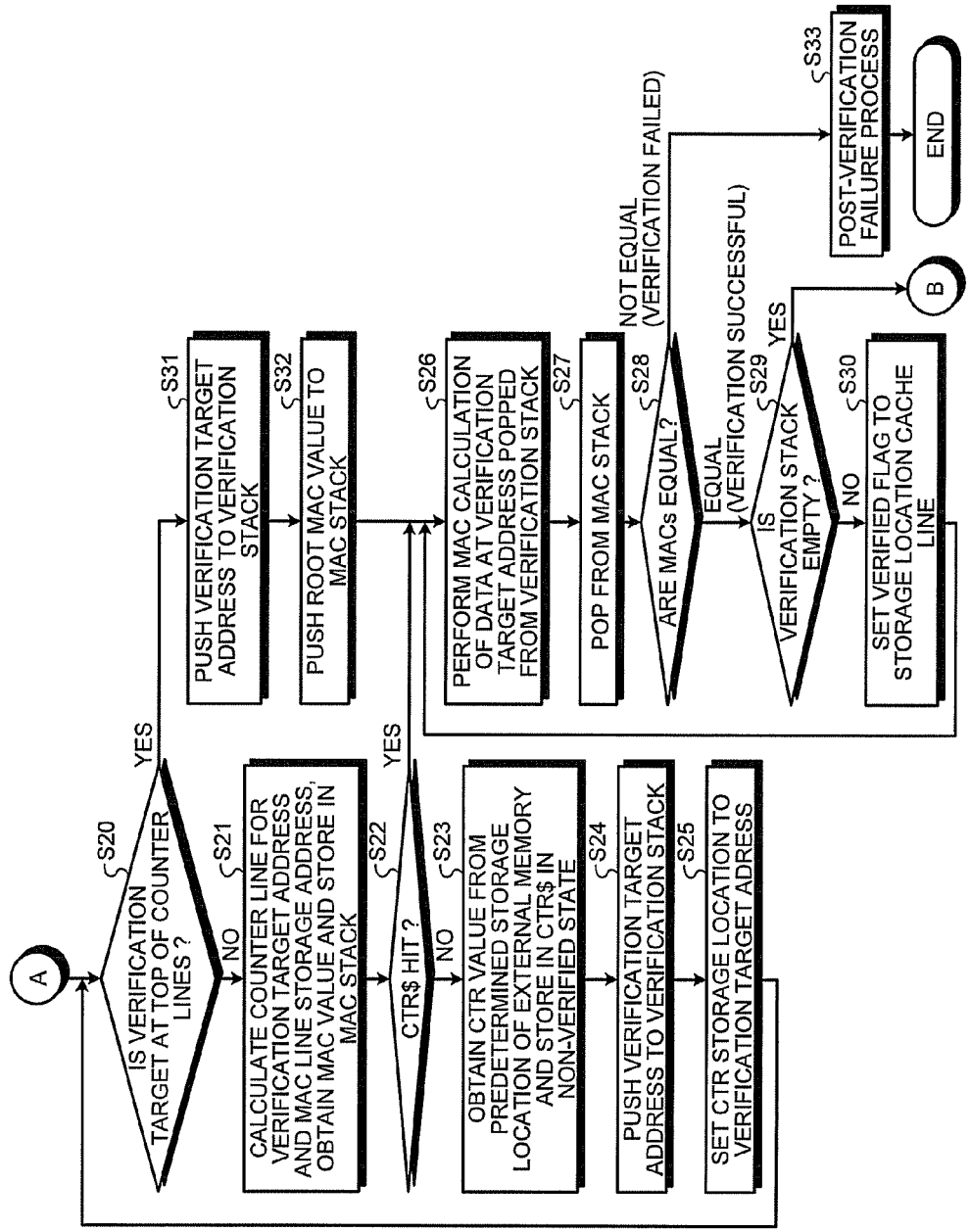
FIG. 8 is a flowchart illustrating a procedure of hierarchical tampering verification according to the embodiment.

Next, the procedure of the hierarchical tampering verification according to the embodiment will be described in detail referring to FIG. 8. It is to be noted that after step S8 described above referring to FIG. 7 and before step S20 of FIG. 8, the MVU 191 has the address of data to be read obtained from the L2 cache 141. In addition, the verification stack 192 in the MVU 191 is cleared and the address of the data to be read is set as the verification target address in step S8. In step S20, the MVU 191 determines whether the verification target is at the top (CTR2-0) of the counter lines.

If the verification target is not at the top of the counter lines (No in step S20), the MVU 191 calculates the counter line in the upper counter associated with the verification target address and the storage location address of the MAC line by a given method. The MAC line is obtained from the L2 cache 141 or the external memory 102, and one MAC block corresponding to the verification target out of the four MAC blocks is pushed to the MAC stack 193 (step S21). Next, the MVU 191 determines whether or not the content of the counter line calculated in step S21 hits in the counter cache 181 (step S22). If the content of the counter line hits in the counter cache 181 (Yes in step S22) and is in a verified state, this means that the counter value stored in the counter cache 181 has been subjected to tampering verification and thus reliable. In this case, the procedure proceeds to step S26 where tampering verification using the MAC value is performed.

On the other hand, if the content of the counter line results in a cache miss in the counter cache 181 (No in step S22), the MVU 191 obtains a counter from the storage location address calculated in step S21 and stores the obtained address in the counter cache 181 (step S23). Then, the MVU 191 pushes the verification target address to the verification stack 192 (step S24). Subsequently, the MVU 191 sets the storage location address of the counter to the verification target address (step S25) and the procedure returns to step S20. The operations of proceeding through the hierarchy from a lower level to an upper level are performed according to this procedure.

In step S26, the MVU 191 requests the dedicated hardware encryption engine 171 to perform MAC calculation of the content (stored in the L2 cache 141 in step S7 in case of data, or stored in the counter cache 181 in step S23 in case of a counter) at the verification target address at one level lower popped from the verification stack 192, and obtains the MAC value associated with the data from the dedicated hardware encryption engine 171. The dedicated hardware encryption engine 171 performs MAC calculation of the data in response to the request from the MVU 191, and passes the resulting MAC value to the MVU 191. Next, the MVU 191 pops the MAC value obtained from the external memory 102 in step S21 from the MAC stack 193 (step S27). The MVU 191 compares the MAC values obtained in steps S21 and S27, and determines whether or not the MAC values are equal to each other (step S28). If the MAC values are equal to each other (Yes in step S28), the tampering verification of the data is successful, and the procedure proceeds to step S29. If the MAC values obtained in step S21 and S27 are not equal to each other (No in step S28), the procedure proceeds to step S33 where the MVU 191 performs a post-verification failure process.

In step S29, the MVU 191 determines whether or not the verification stack 192 and the MAC stack 193 are empty through stack processes. If the verification stack 192 and the MAC stack 193 are empty (Yes in step S29), this means that the integrity verification of the data read from the external memory 102 to the L2 cache 141 in step S7 is successful, and it is detected that the data are not tampered. In this case, the procedure proceeds to step S10 of FIG. 7 where the fill process in which data are read from the L2 cache 141 to the L1 data cache 131 is performed. On the other hand, if the verification stack 192 and the MAC stack 193 are not empty (No in step S29), the MVU 191 sets the verified flag 814 on the cache line in the L2 cache 141 from which data are read (step S30). Then, the procedure returns to step S26 and the same processes are repeated. As a result, the hierarchical tampering verification is performed.

If, however, there is no verified counter value in the counter cache 181, it is determined in step S20 that the verification target is at the top of counter lines (Yes in step S20). In this case, the procedure proceeds to step S31 where the MVU 191 pushes the address of the top counter line (CTR2-0) to the verification stack 192, and to step S32 where the MVU 191 pushes the value of Root MAC 203-2 to the MAC stack 193. Subsequently, the procedure proceeds to step S26, and the hierarchical tampering verification is performed by carrying out the looped processes described above.

Next, the timing of MAC calculation will be described. The MAC is calculated and written to the external memory 102 when a line where the verification target flag 813 is set to "1" and the writing flag 812 is set to "1" of data stored in the L2 cache 141 or the counter cache 181 is flushed and written to the external memory 102. An associated verified counter value is necessary for the calculation of the MAC. In this case, the MVU 191 reads the counter line to the counter cache 181 through hierarchical tampering verification of the counters by a procedure similar to that of the tampering verification at writing to the cache line described above, increments the lower counter value associated with the data and calculates the MAC, and writes the calculated MAC together with the data written from the L2 cache 141 to the external memory 102.

Here, procedures of a MAC calculation process at writing to a cache line according to the conventional technology and according to the embodiment will be described. As described with reference to FIGS. 3 and 5, the size of the lower counters (603-0 to 603-63, 703-0 to 703-63) is 7 bits or 6 bits, the lower counters overflow if read and write (flush) from/to the associated data lines are repeated 128 times or 64 times. If a lower counter overflows, the upper counter is incremented and the lower counter is reset to "0". In this case, it is natural to write data (second data piece) and the MAC (first data verification value) for the cache line to be flushed (hereinafter referred to as a cause line). Moreover, since the upper counter value is changed, reading of data (first data piece), recalculation of the MAC (first data verification value) and writing of the MAC are also performed for the other cache lines having the upper counter in common (hereinafter referred as related lines) as a result of changing the upper counter value. However, only the recalculation of the MAC is sufficient and writing of data is not necessary for the data newly read for the recalculation and the data that already exist in the cache line and have not changed. The series of procedures will be hereinafter referred to as MAC recalculation at overflow. In the MAC recalculation at overflow, data that are normally not needed to be read are read once and the MAC is recalculated and written. Thus, this process not only imposes a great overhead by occupying the internal bus 161 and the memories (denoted by reference numerals 121, 131, 141 and 181) inside of the microprocessor 101 but also occupies mainly the internal bus 161 and the dedicated hardware encryption engine 171. As a result, the response performance of the entire memory system will be lowered. Therefore, in the embodiment, the number of times of MAC recalculation at overflow of lower counters is reduced while maintaining the accuracy of the integrity verification of data to prevent degradation of the response performance of the entire memory system.

Figure 9:
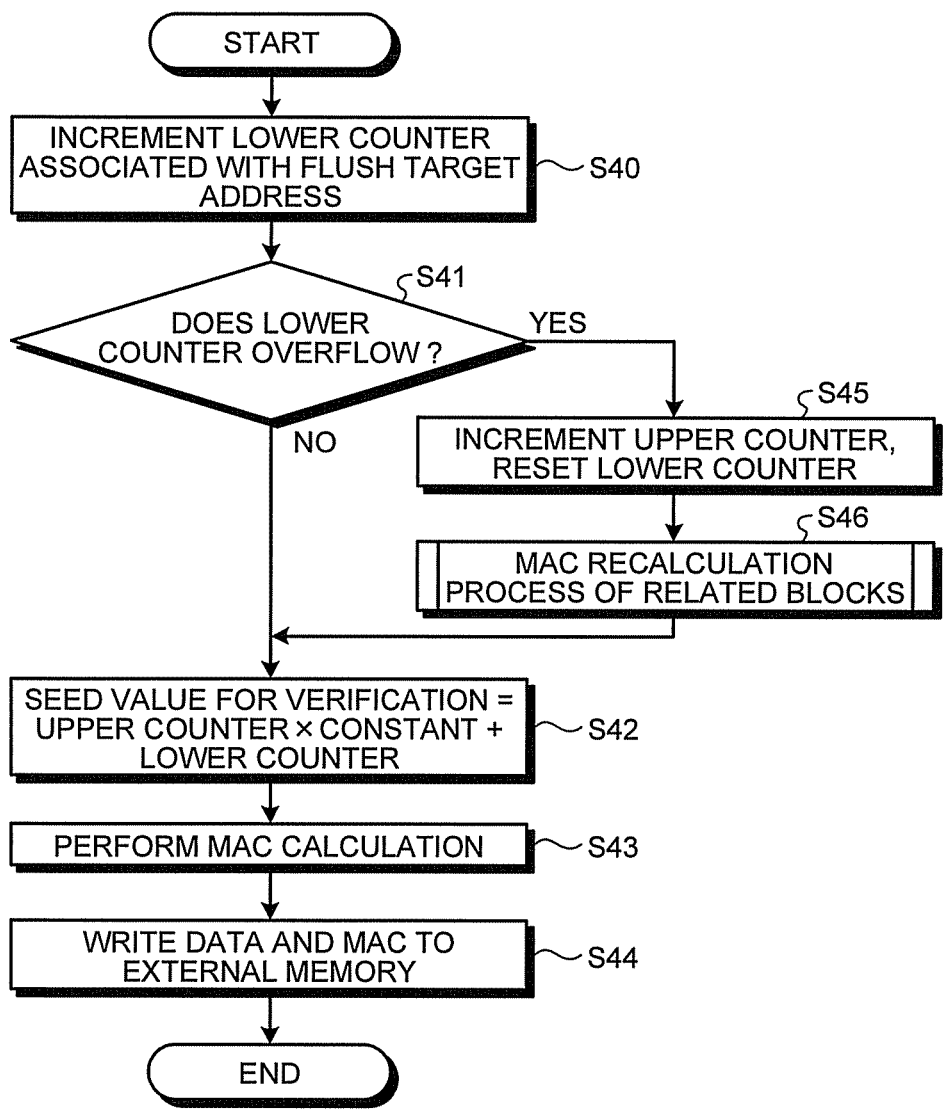
FIG. 9 is a flowchart illustrating a procedure of a MAC calculation process at writing to a cache line according to the embodiment.

Here, the procedure of the MAC calculation process at writing to a cache line will be first described referring to FIG. 9. This is a process performed when data (second data piece) in a cache line for which the writing flag 812 and the verification target flag 813 are "1" in a cache memory of either of the L2 cache 141 and the counter cache 181 are written to the external memory 102. The MVU 191 increments a lower counter associated with a write target address (step S40). If no counter line is in the cache memory, reading and verification of a counter line are performed. In this process, since the write target cache line is in the cache memory, MAC verification of the cache line is not needed.

Next, the MVU 191 determines whether the lower counter overflows as a result of being incremented in step S40 (step S41). If the lower counter overflows (Yes in step S41), the MVU 191 increments the upper counter, resets the lower counter (step S45) and then performs the MAC recalculation processes of the related lines in step S46.

On the other hand, if the lower counter does not overflow (No in step S41), the MVU 191 assigns "upper counter× constant+lower counter" as a seed value for verification (step S42), requests the dedicated hardware encryption engine 171 to perform MAC calculation of the data, obtains a MAC value of the data from the dedicated hardware encryption engine 171 (step S43) and write the data and the MAC into the external memory 102 (step S44).

Figure 10:
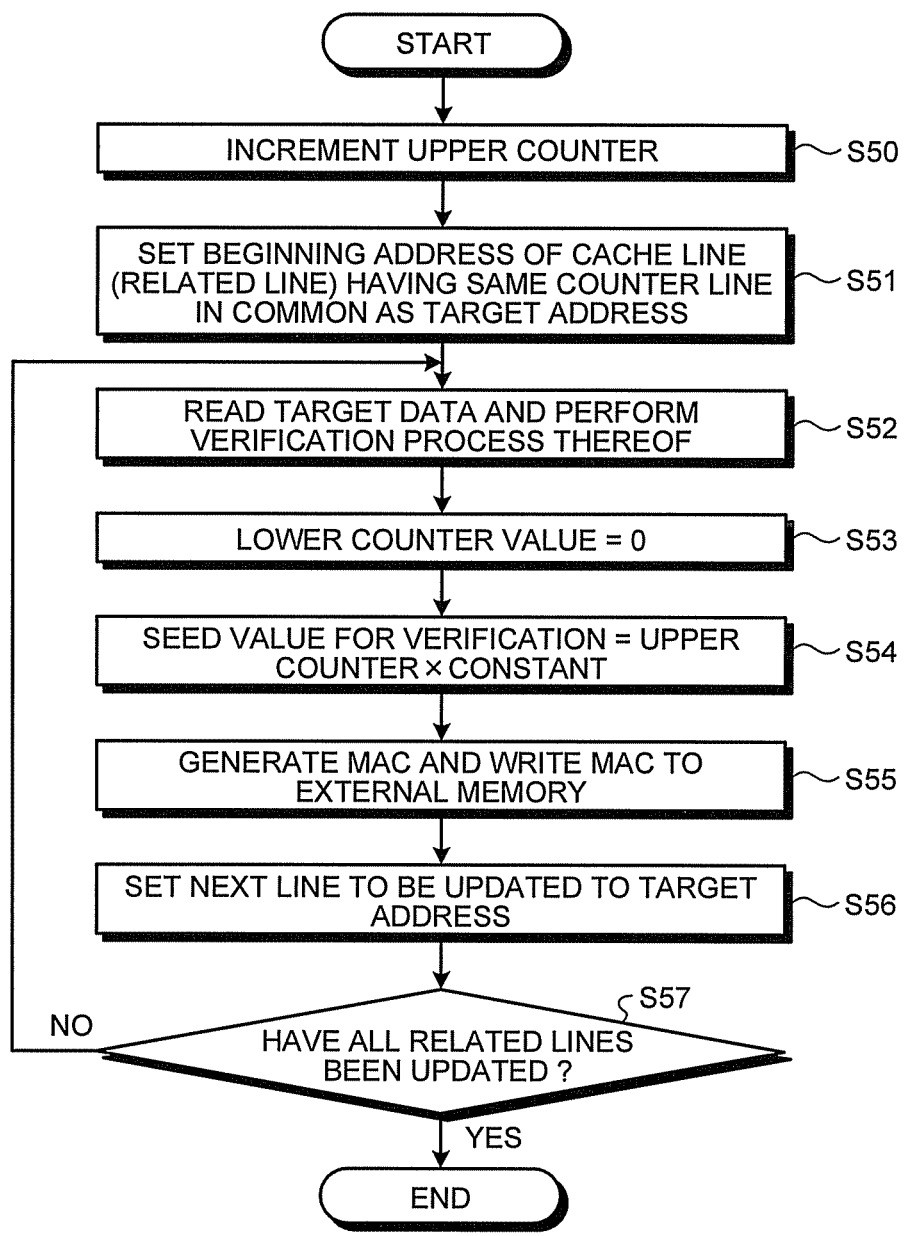
FIG. 10 is a flowchart illustrating a procedure of a MAC recalculation process for related blocks according to a conventional technology.
Figure 11:
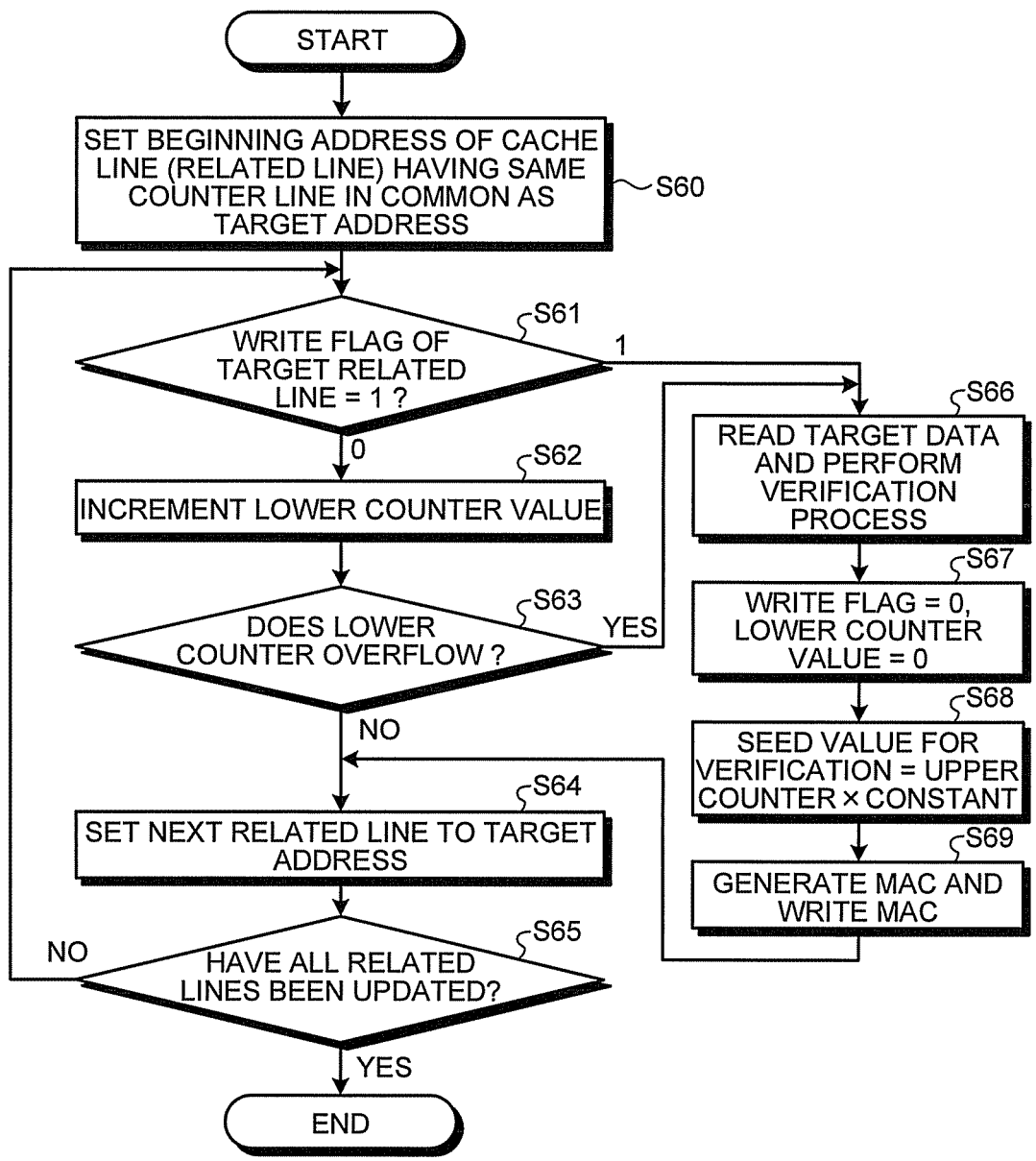
FIG. 11 is a flowchart illustrating a procedure of a MAC recalculation process for related blocks according to the embodiment.

Next, a detailed procedure of the MAC recalculation process for the related lines performed in step S46 will be described by comparing the conventional technology and the embodiment. FIG. 10 is a flowchart illustrating a procedure of the MAC recalculation process for related lines according to the conventional technology. FIG. 11 is a flowchart illustrating the procedure of the MAC recalculation process for related lines according to the embodiment. First, the procedure according to the conventional technology will be described. The MVU 191 increments the upper counter (step S50), and sets the beginning address of a cache line (related line) having the same counter line in common as the verification target address (step S51). Then, the MVU 191 reads verification target data (first data piece) based on the verification target address from the cache memory and performs tampering verification of the verification target data (step S52). Then, the MVU 191 resets the lower counter value to "0" (step S53). Subsequently, the MVU 191 assigns "upper counter×constant" as a seed value for verification (first secret value for each data) in writing data (step S54), requests the dedicated hardware encryption engine 171 to perform MAC calculation of the data, obtains a MAC value (first data verification value) of the data from the dedicated hardware encryption engine 171 and writes the data and the MAC into the external memory 102 (step S55). Then, the MVU 191 sets the beginning address of the next cache line to the verification target address (step S56). Next, the MVU 191 determines whether or not the MAC recalculation process of all the related lines except for the cause line is completed (step S57). If the determination result is negative (No in step S57), the procedure returns to step S52. If the determination result is positive (Yes in step S57), the MAC recalculation process for the related blocks is terminated.

Next, the procedure of the MAC recalculation process for the related blocks performed in step S46 according to the embodiment will be described referring to FIG. 11. Before this process, the MVU 191 confirms that the upper counter is incremented as a result of overflow of the lower counter caused by cause line flush. Then, in step S60, the MVU 191 sets the beginning address of a cache line (related line) having the same counter line in common as the verification target address similarly to step S51 in FIG. 10. In the example illustrated in FIG. 4, if the cause line is Data3, Data0 to Data63 having counter values stored in CTR1-0 are related lines (first data piece). The beginning address of Data0 is set to the verification target address.

Next, the MVU 191 determines whether the write flag of the related line is "1" (step S61). If the write flag is "1" (Yes in step S61), which means that a write is performed, the MAC value is recalculated based on the updated upper counter similarly to the conventional technology. Specifically, the MVU 191 reads verification target data stored in the related line and performs tampering verification of steps S20 to S33 of FIG. 8 described above similarly to step S52 of FIG. 10 (step S66). Then, the MVU 191 resets the write flag of the related line to "0" in the embodiment unlike the conventional technology. The MVU 191 also resets the lower counter value to "0" similarly to step S53 of FIG. 10 (step S67). Subsequently, the MVU 191 assigns "upper counter×constant" as a seed value for verification (step S68), requests the dedicated hardware encryption engine 171 to perform MAC calculation of the data, obtains a MAC value of the data from the dedicated hardware encryption engine 171 and writes the data and the MAC into the external memory 102 (step S69) similarly to steps S54 and S55 of FIG. 10. The procedure then proceeds to step S64.

On the other hand, if the write flag of the related line is "0" (No in step S61), which means that no write is performed to the related line, the MVU 191 increments the lower counter value (step S62). Next, the MVU 191 determines whether the lower counter overflows (step S63). If the lower counter overflows (Yes in step S63), the procedure proceeds to step S66. As a result, the MAC recalculation of the data is performed based on the updated upper counter similarly to the conventional technology (steps S66 to S69).

If the lower counter does not overflow (No in step S63), the MVU 191 skips the MAC recalculation for the line unlike the conventional technology, and sets the next related line (Data1) to the target address in step S64. Then, the MVU 191 determines whether or not the MAC recalculation is completed for all the related lines except for the cause line (step S65). If the determination result is negative (No in step S65), the procedure returns to step S61. If the determination result is positive (Yes in step S65), the MAC recalculation process for the related blocks is terminated.

In the embodiment as described above, the reduction in the number of times of MAC recalculation at overflow of the lower counter is realized by skipping the MAC recalculation. However, since the MAC recalculation is performed to reflect the upper counter update in the MAC value, the tampering verification described above will result in a failure if the MAC recalculation is simply skipped. There is also a difference in the MAC calculation at reading of a cache line from the conventional technology so as to avoid the failure.

Figure 12:
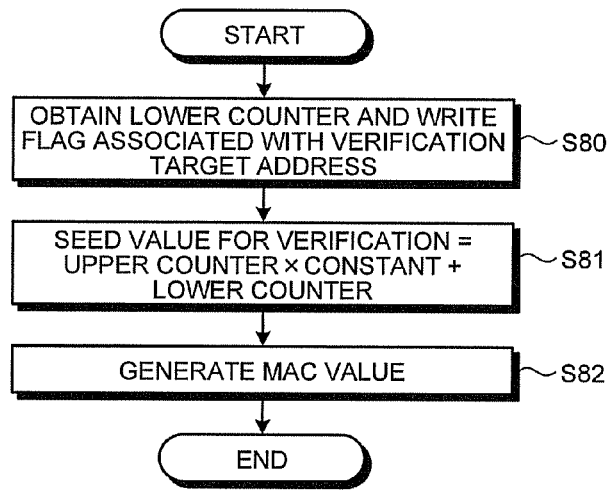
FIG. 12 is a flowchart illustrating a procedure of a MAC calculation process at reading a cache line according to the conventional technology.
Figure 13:
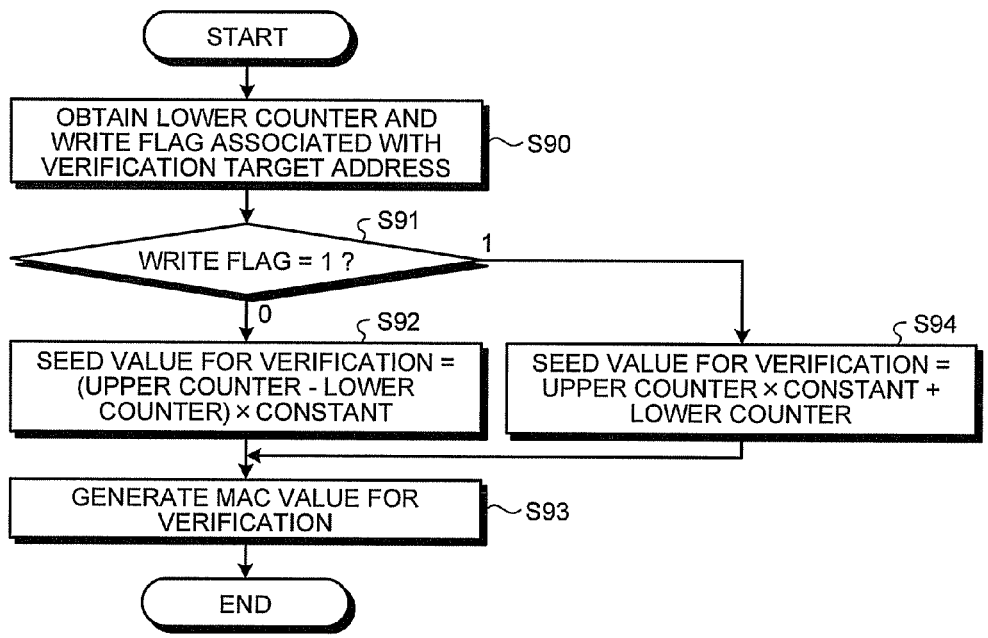
FIG. 13 is a flowchart illustrating a procedure of a MAC calculation at reading a cache line according to the embodiment.

Next, a procedure of the MAC calculation process at reading of a cache line will be described by comparing the conventional technology and the embodiment. FIG. 12 is a flowchart illustrating a procedure of the MAC calculation process at reading a cache line according to the conventional technology. FIG. 13 is a flowchart illustrating the procedure of the MAC calculation at reading a cache line according to the embodiment. First, the procedure according to the conventional technology will be described. The MVU 191 obtains a lower counter value and a write flag associated with the verification target address (step S80). Then, the MVU 191 assigns "upper counter×constant+lower counter" as a seed value for verification (second secret value for each data) at reading (step S81), requests the dedicated hardware encryption engine 171 to perform MAC calculation of the data, and obtains a MAC value (second data verification value) of the data from the dedicated hardware encryption engine 171 (step S82).

Next, the procedure of the MAC calculation at reading of a cache line according to the embodiment will be described referring to FIG. 13. In step S90, the MVU 191 obtains a lower counter value and a write flag associated with the verification target address similarly to step S80 of FIG. 12. Then, the MVU 191 determines whether or not the write flag obtained in step S90 is "1" (step S91). If the write flag is "1" (Yes in step S91), the MVU 191 obtains a seed value for verification similarly to step S81 of FIG. 12 (step S94), and the procedure proceeds to step S93. On the other hand, if the write flag is "0" (No in step S91), which means that no write is performed to the line since the previous MAC calculation, the MVU 191 assigns "(upper counter−lower counter)×constant" as the seed value for verification (second secret value for each data) (step S92), and the procedure proceeds to step S93. In step S93, the MVU 191 requests the dedicated hardware encryption engine 171 to perform MAC calculation of the data, and obtains a MAC value of the data from the dedicated hardware encryption engine 171. The MAC value (second data verification value) for comparison in reading obtained in step S93 is to be compared with the MAC value obtained from the external memory 102 in step S27 of FIG. 8.

Here, the reason for which skipping of MAC value recalculation and successful tampering verification are possible at the same time by combining the MAC recalculation process illustrated in FIG. 11 and the MAC recalculation process illustrated in FIG. 13 will be explained. First, in incrementing the upper counter caused by the cause line flush in the MAC value recalculation process of related lines, the lower counter is incremented for a related line in which no write (writing) is performed and thus the values do not change. In this case, the lower counters function to hold the number of times the MAC value recalculation is skipped for the related lines at the increment of the upper counter. Then, in verification, the lower counter value is subtracted from the upper counter in calculation of the seed value for verification of a cache line with the write flag "0" (namely, a related line). In the conventional technology, since a cache flush is not needed for a cache line in which no write is performed, the lower counter should be always "0". Thus, the function can be replaced by providing a write flag.

In the embodiment as described above, for counters at a child level that have a set membership with the upper counter value in common among counters used for integrity verification and configured hierarchically, write flags indicating that no write has been performed since the previous update of the upper counter value are provided at the respective counters at the child level. Further, a difference value between the upper counter value used for calculating the current MAC value and the current upper counter value of a block in which no write is performed is held as the lower counter value of the block. As a result, the MAC value recalculation is inhibited when another counter value at the child level that has the upper counter value in common therewith overflows, and the number of times of MAC recalculation is reduced. Therefore, an effect of suppressing degradation in the response performance of the memory system is produced. The effect is to such an extent that the overhead of the MAC recalculation at overflow of counters can be reduced by an amount equivalent to a case where the bit length of a counter for each block is doubled. In addition, in a case where the overhead of the MAC recalculation is equal but the bit length of the counters is reduced by half, the levels of tree of counter values necessary for covering an equal memory area can also be reduced by about half, and the amount of memory in the microprocessor 101 necessary for holding the tree of counter values can be reduced. Moreover, the timing distribution for the MAC recalculation caused by overflow of counters is achieved naturally based on the randomness of memory access. Therefore, loads of the MAC recalculation can be distributed temporally without any particular scheduling process and the worst value of the response performance of the memory system can be improved. In addition, it is possible to prevent degradation in the space efficiency of the external memory 102.

The cryptographic calculation process of the MAC value described above is referred to as calculation and recalculation of a data verification value. Further, the MAC verification process at reading data described above is referred to as a verification unit, and the update of a counter value and the MAC value calculation process at writing data described in paragraphs 0037 to 0051 is referred to as an assignment unit. Since the assignment unit and the verification unit that perform hierarchical processes can share certain hardware, the assignment unit and the verification unit are integrated as the MVU 191 in the hardware configuration illustrated in FIG. 1. Calculation of data is performed by the encryption engine 171. In addition, a first storage unit holding the root secret value is provided with reference numeral 203, and a second storage unit holding the counter value for each data is provided as the counter cache 181.

Here, an example of operations of counter value update and MAC value update will be described by comparing the conventional technology with the embodiment referring to FIGS. 14 to 17 so as to clarify the effects of the embodiment. FIG. 14 is a diagram illustrating an outline of procedures of counter value update and MAC calculation according to the conventional technology. FIG. 15 is a table showing states in corresponding procedures illustrated in FIG. 14. FIG. 16 is a diagram illustrating an outline of procedures of counter value update and MAC calculation according to the embodiment. FIG. 17 is a table showing states in corresponding procedures illustrated in FIG. 16. The form of the tables, the association of cache lines and the timings at which cache lines are flushed are the same in the conventional technology and in the embodiment.

In FIG. 14, the numerals (1) to (9) indicate logical times (the intervals between logical times are not equal). The vertical axis shows the upper counter value and the lower counter value used for calculating the MAC value given to the counter at logical times (1) to (9). The horizontal axis shows a change in the counter values of three cache lines of lines 2, 1 and 0 belonging to the same group of related lines. The bit width of the lower counters is set to 2 bits herein so as to examine overflow of the counters. The writing patterns of the three cache lines are different from one another. Data in the line 2 are only read (read-only), and no write is performed to the cache line of the line 2. The line 1 is a cache line with low write frequency (frequency of flush in a written state), data of which are written back to the external memory 102 (flushed) only once during the period shown in FIG. 14. The line 0 is a cache line with high write frequency, which is flushed 20 times during the period shown in FIG. 14. In FIG. 15, changes of states of the counter values, write operations, flush and MAC recalculation for the lines 2, 1 and 0 at every logical time shown in FIG. 14 are shown.

In the conventional technology, all the lines 2, 1 and 0 are in a state where "upper counter (C)=lower counter (c)=0" at the starting logical time (1) as shown in FIGS. 14 and 15. At logical time (2), the line 0 is flushed and the lower counter thereof becomes "c=1". At logical time (3), the line 1 is flushed and the lower counter thereof becomes "c=1". At logical times (3) to (5), the line 0 is flushed once per logical time and the lower counter of the line 0 overflows. As a result, the MAC recalculation is performed for the lines 1 and 2. At logical times (6) to (9), only the line 0 is flushed four times and the lower counter thereof overflows once per logical time. In the conventional technology, the MAC recalculation is always performed for the related lines when the lower counter of the line 0 overflows. In the example shown in FIGS. 14 and 15, the MAC recalculation is performed ten times in total for two related lines.

In the embodiment, on the other hand, the operations before logical time (4) when the first overflow of the lower counter occurs in line 0 are the same as those in the conventional technology, as shown in FIGS. 16 and 17. Since write to the line 1 is performed and the line 1 is flushed, the write flag of the line 1 is set to "1" at logical time (3) before logical time (5) at which the lower counter of the line 1 overflows. The write flag of the line 2 that is not flushed between logical times (1) and (5) is still "0". At logical time (5), when the lower counter overflows, the MAC recalculation is performed for the line 1 to which write is performed similarly to the conventional technology. On the other hand, the MAC recalculation is skipped for the line 2 to which no write is performed, and instead, the lower counter is incremented and thus set to "1". In this process, no data read or data write is performed from/to the line 2, but only the lower counter associated with the line 2 in the counter cache 181 is incremented. Therefore, the processing time is much shorter than the MAC recalculation.

After logical time (5), the line 1 and the line 2 are not flushed, the line 0 is flushed four times during each logical time between logical times (5) and (9), that is 16 times in total, and the lower counter overflows four times in total. As a result of overflows of the counter of the line 0 occurring between logical times (5) and (7), the lower counter of the line 2 is incremented by 1 each time and overflows between logical times (7) and (8). The MAC recalculation is performed for the line 2 at this overflow. Since the lower counter of the line 1 has not yet overflowed at logical time (8), the MAC recalculation is not performed. For the line 1 for which an overflow occurred at logical time (5), an overflow occurs later between logical times (8) and (9).

In the embodiment, MAC recalculation is performed at different times for different cache lines depending on the time at which previous MAC recalculation is performed on each cache line as described above. Therefore, the timings of MAC recalculation are distributed temporally. With such a configuration, MAC recalculation for the line 2 that is not flushed at all is performed once per 16 overflows of the lower counters of related lines. In the conventional technology, on the other hand, MAC recalculation for the line 2 is performed once per 4 overflows of the lower counters of related lines. Thus, the embodiment has an effect equivalent to a case where the bit length of the lower counters is doubled. Although the number of bits needed is increased to hold the write flag, only one bit of the write flag is added to the counter in this case, which only increases the frequency of MAC recalculation from 4 times to 8 times. This difference will be more significant as the bit length of the original counter is longer. Moreover, while the MAC recalculation is performed simultaneously for all the related lines in the conventional technology, the MAC recalculation is performed at different timings depending on the timings of previous flushes in the embodiment, whereby the embodiment has an effect that the calculation load is distributed without requiring any additional scheduling mechanism and the system load is equalized.

Next, the microprocessor 101 according to the embodiment described above will be described by referring to an example in which the microprocessor 101 is applied to a power system for processing a large amount of personal information and billing information in real time. FIG. 18 is a diagram illustrating a configuration of a next-generation power grid (smart grid) as the power system. In the next-generation power grid, a smart meter 3010*a* configured to gather electricity use data and a home energy management system (HEMS) 3020 that is a home server configured to manage household electrical appliances are installed in every home. In addition, for commercial buildings, a building energy management system (BEMS) 3030 that is a server configured to manage electrical equipments within a building is installed in every building. A smart meter 3010*b* similar to the smart meter 3010*a* is installed in every commercial building. The smart meters 3010*a*, 3010*b* will be hereinafter referred to simply as a smart meter 3010.

Several smart meters 3010 are grouped for each repeater (concentrator) 3040 called a concentrator. Each smart meter 3010 communicates with a meter data management system (MDMS) 3050 through a communication network. The MDMS 3050 receives electricity use data from the smart meter 3010 in every home at regular intervals and stores the received data. An energy management system (EMS) 3060 performs power control including requesting the smart meter 3010 or the HEMS 3020 in every home to reduce electricity use based on electricity use data of homes gathered in the MDMS 3050 or information from sensors installed in an electric power system. In addition, the EMS 3060 controls dispersed power sources 3080 such as solar power and wind power connected to a remote terminal unit (RTU) 3071, an electric storage device 3090 connected to a RTU 3072, and a transmission/distribution control device 3100 connected to a RTU 3073 and configured to control operations with power generation, so as to control voltages and frequencies in the whole smart grid to be stabilized.

In this configuration, the systems including the HEMS 3020, the BEMS 3030, the MDMS 3050 and the EMS 3060 gather information from a number of smart meters 3010 or electric power devices and control and store the gathered information. If a physical tampering attack or a tampering attack by malware is made on memories of such systems, not only economic loss caused by illicit billing or the like but also damage such as a power grid failure may be caused. If the memory integrity verification explained in the embodiment described above is applied to at least one of these systems, an effect of preventing such damage can be obtained.

Modified Examples

The invention is not limited to the embodiment presented above, but may be embodied with various modified components in implementation without departing from the spirit of the inventions. Further, the invention can be embodied in various forms by appropriately combining a plurality of components disclosed in the embodiment. For example, some of the components presented in the embodiment may be omitted. In addition, various modifications as described as examples below may be made.

While an example of a cache memory in which data are read and written in units of a cache line is explained in the above-described embodiment, the invention may be applied to an example in which data are read and written in units of a page or the like. In such case, the unit by which data are read and written is called a block.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory management device to which a memory is connected and which performs verification at reading of data stored in the memory and at writing of data to the memory, the device comprising:
   a first hardware storage configured to store therein a root secret value that is a secret value assigned to the memory;
   a second hardware storage configured to hold an upper counter value that is in common among a predetermined plurality of data pieces and lower counter values associated with the data pieces, respectively;
   an assignment engine configured to update counter values including the upper counter value and the lower counter values at writing of the data pieces to the memory and calculate data verification values; and
   a verification engine configured to perform a verification process of the data verification values at reading of the data pieces, wherein
   at writing of first data piece to the memory:
   the assignment engine increments a lower counter value associated with the first data piece each time the first data piece is written to the memory;
   when the lower counter value associated with the first data piece overflows, the assignment engine updates counter values associated with the first data piece by incrementing the upper counter value in common among the plurality of data pieces and resetting the lower counter value;
   the assignment engine calculates a first secret value for each data piece using the counter values associated with the first data piece and the root secret value, and calculates a first data verification value using the first data piece and the first secret value for each data piece;
   when the counter values associated with the first data piece are updated, the assignment engine recalculates the first secret value for each data piece using the updated counter values and the root secret value, and recalculates the first data verification value using the first data piece and the recalculated first secret value for each data piece; and
   the assignment engine writes the first data piece and the calculated first data verification value or the recalculated first data verification value to the memory,
   at reading of the first data piece from the memory:
   the verification engine reads the first data piece and the first calculated data verification value from the memory;
   when the first data piece and the first data verification value are read, the verification engine calculates a second secret value for each data piece using updated values of the counter values associated with the first data piece and the root secret value, and calculates a second data verification value using the read first data piece and the second secret value for each data piece; and
   the verification engine compares the read first data verification value and the second data verification value to perform verification of the read first data piece, and
   at writing of second data piece to the memory:
   when a lower counter value associated with the second data piece overflows, the assignment engine updates counter values associated with the second data piece by incrementing the upper counter value in common among the plurality of data pieces and resetting the lower counter value;
   the assignment engine calculates another first secret value for each data piece using the counter values associated with the second data piece and the root secret value, and calculates a second data verification value using the second data piece and the another first secret value for each data piece; and
   when the counter values associated with the second data piece are updated, the assignment engine recalculates the first secret value for each data piece using the updated counter values and the root secret value, and recalculates the first data verification value using the second data piece and the first secret value for each data piece, the assignment engine writes the second data piece and the calculated second data verification value or the recalculated first data verification value to the memory.

2. The device according to claim 1, wherein
   the assignment engine increments the lower counter value each time the first data piece is written to the memory, and when the lower counter value overflows, the assignment engine updates the counter values associated with the first data piece by incrementing the upper counter value and resetting the lower counter value,
   when the upper counter value is incremented as a result of writing the first data piece to the memory, the assignment engine increments to update the lower counter value associated with the second data piece having the upper counter value in common, and when the upper counter value is incremented as a result of writing the first data piece to the memory and the lower counter value associated with the second data piece overflows as a result of incrementing the lower counter value, the assignment engine resets the lower counter value to update the lower counter associated with the second data piece,
   when the counter values associated with the second data piece are updated as a result of writing the first data piece to the memory, the assignment engine recalculates the first secret value for each data piece using the updated counter values associated with the second data piece and recalculates the first data verification value using the second data, the root secret value and the recalculated first secret value for each data piece, and when the counter values associated with the first data piece are updated as a result of writing the second data piece to the memory and the lower counter value does not overflow as a result of incrementing the lower counter, the assignment engine skips recalculation of the first secret value for each data piece and writing the first data piece and the first data verification value to the memory, when the counter values associated with the first data piece are updated as a result of writing the second data piece to the memory and the lower counter value included in the counter values associated with the first data piece overflows as a result of being incremented, the assignment engine recalculates the first data verification value, and the assignment engine calculates the second secret value for each data piece using "(the upper counter value−the lower counter value)×a constant" and the root secret value at reading of the second data piece.

3. The device according to claim 1, wherein a flag indicating whether data pieces written to the memory are associated with the counter values for each lower counter value, the memory management device further includes an updating engine configured to, when writing of the first data piece to the memory is performed, update a first flag that is associated with the lower counter value associated with the first data piece so that the first flag indicates that writing of the first data piece to the memory is performed and, when the upper counter is incremented as a result of writing the second data piece having an upper counter value in common to the memory, update the first flag to indicate that writing of the first data piece to the memory is not performed, when the first flag indicates that writing of the first data piece to the memory is performed, the assignment engine recalculates the first secret value for each data piece, when the first flag indicates that writing of the first data piece to the memory is not performed and the lower counter value included in the counter values associated with the first data piece does not overflow as a result of being incremented, the assignment engine skips recalculation of the first secret value for each data piece, and when the first flag indicates that writing of the first data piece to the memory is not performed and the lower counter value included in the counter values associated with the first data piece overflows as a result of being incremented, the assignment unit engine recalculates the first secret value for each data piece, and when the first flag indicates that the writing of the first data piece is performed at reading of the first data piece, the assignment engine calculates the second secret value for each data piece using "(the upper counter value−the lower counter value)×a constant" and the root secret value.

4. The device according to claim 3, wherein the assignment engine has a hierarchical structure where an upper counter value and a plurality of lower counter values having the upper counter value in common are combined, and writes the counter values associated with the flag for each of the lower counter values to at least one of the memory and the second hardware storage, the assignment engine reads the counter values stored in at least one of the memory and the second hardware storage, and the assignment engine calculates the second secret value for each data piece using the counter values stored in at least one of the memory and the second hardware storage unit and the root secret value.

5. The device according to claim 1, wherein the first data piece and the second data piece are in units of a block, and the assignment engine assigns the counter values unique to an address in units of a block in the memory to which the first data piece is to be written to, and unique to a command value of the upper counter value and the lower counter value.

6. A memory management method implemented in a memory management device to which a memory is connected and which performs verification at reading of data stored in the memory and at writing of data to the memory, wherein the memory management device includes: a first storage unit that stores a root secret value that is a secret value assigned to the memory; and a second storage unit that holds an upper counter value that is in common among a predetermined plurality of data pieces and lower counter values associated with the data pieces, respectively, the method comprising:

assigning step of updating counter values including the upper counter value and the lower counter values at writing of the data pieces to the memory and calculating data verification values; and verifying the data verification value at reading of the data piece, wherein at writing of first data piece to the memory:

the assigning step includes:

incrementing a lower counter value associated with the first data piece each time the first data piece is written to the memory;

when the lower counter value associated with the first data piece overflows, updating the counter values associated with the first data piece by incrementing the upper counter value in common among the plurality of data pieces and resetting the lower counter value;

calculating a first secret value for each data piece using the counter values associated with the first data piece and the root secret value, and calculating a first data verification value using the first data piece and the first secret value for each data piece;

when the counter values associated with the first data piece are updated, recalculating the first secret value for each data piece using the updated counter values and the root secret value, and recalculating the first data verification value using the first data piece and the recalculated first secret value for each data piece; and writing the first data piece and the calculated first data verification value or the recalculated first data verification value to the memory, at reading of the first data piece from the memory:

the verifying includes:

reading the first data piece and the first calculated or recalculated data verification value from the memory;

when the first data piece and the first calculated or recalculated data verification value are read, calculating a second secret value for each data piece using updated values of the counter values associated with the first data piece and the root secret value, and calculating a second data verification value using the read first data piece and the second secret value for each data piece; and comparing the read first data verification value and the second data verification value to perform verification of the read first data piece, and at writing of second data piece to the memory:

the assigning step includes:

when a lower counter value associated with the second data piece overflows, updating counter values associated with the second data piece by incrementing the upper counter value in common among the plurality of data pieces and resetting the lower counter value;

calculating another first secret value for each data piece using the counter values associated with the second data piece and the root secret value, and calculating another second data verification value using the second data piece and the another first secret value for each data piece;

when the counter values associated with the second data piece are updated, recalculating the first secret value for each data piece using the updated counter values and the root secret value, and recalculating the first data verification value using the second data piece and the calculated another first secret value for each data piece; and writing the second data piece and the calculated another second data verification value or the recalculated first data verification value to the memory.

7. The method according to claim 6, wherein the assigning step increments the lower counter value each time the first data piece is written to the memory, and when the lower counter value overflows, the assigning step updates the counter values associated with the first data piece by incrementing the upper counter value and resetting the lower counter value, when the upper counter value is incremented as a result of writing the first data piece to the memory, the assigning step increments to update the lower counter value associated with the second data piece having the upper counter value in common, and when the upper counter value is incremented as a result of writing the first data piece to the memory and the lower counter value associated with the second data piece overflows as a result of incrementing the lower counter value, the assigning step resets the lower counter value to update the lower counter value associated with the second data piece, when the counter values associated with the second data piece are updated as a result of writing the first data piece to the memory, the assigning step recalculates the first secret value for each data piece using the updated counter values associated with the second data piece and recalculates the first data verification value using the second data piece, the root secret value and the recalculated first secret value for each data piece, and when the counter values associated with the first data piece are updated as a result of writing the second data piece to the memory and the lower counter value does not overflow as a result of incrementing the lower counter, the assigning step skips recalculation of the first secret value for each data piece and writing the first data piece and the first data verification value to the memory, when the counter values associated with the first data piece are updated as a result of writing the second data piece to the memory and the lower counter value included in the counter values associated with the first data piece over-flows as a result of being incremented, the assigning step recalculates the first data verification value, and the assigning step calculates the second secret value for each data piece using "(the upper counter value−the lower counter value)×a constant" and the root secret value at reading of the second data piece.

8. The device according to claim 6, wherein a flag indicating whether data pieces written to the memory are associated with the counter values for each lower counter value, the memory management method further includes an updating step, wherein in response to writing of the first data piece to the memory is performed, the updating step updates a first flag that is associated with the lower counter value associated with the first data piece so that the first flag indicates that writing of the first data piece to the memory is performed and, in response to the upper counter being incremented as a result of writing the second data piece having an upper counter value in common to the memory, the updating step updates the first flag to indicate that writing of the first data piece to the memory is not performed, in response to the first flag indicating that writing of the first data piece to the memory is performed, the assigning step recalculates the first secret value for each data piece, in response to the first flag indicating that writing of the first data piece to the memory is not performed and the lower counter value included in the counter values associated with the first data piece does not overflow as a result of being incremented, the assigning step skips recalculation of the first secret value for each data piece, and in response to the first flag indicating that writing of the first data piece to the memory is not performed and the lower counter value included in the counter values associated with the first data piece overflows as a result of being incremented, the assignment step recalculates the first secret value for each data piece, and in response to the first flag indicating that the writing of the first data piece is performed at reading of the first data piece, the assigning step calculates the second secret value for each data piece using "(the upper counter value−the lower counter value)×a constant" and the root secret value.

9. The device according to claim 8, wherein the assigning step employs a hierarchical structure where an upper counter value and a plurality of lower counter values having the upper counter value in common are combined, and writes the counter values associated with the flag for each of the lower counter values to at least one of the memory and the second storage unit, the assigning step reads the counter values stored in at least one of the memory and the second storage unit, and the assigning step calculates the second secret value for each data piece using the counter values stored in at least one of the memory and the second storage unit and the root secret value.

10. The device according to claim 6, wherein the first data piece and the second data piece are in units of a block, and the assigning step assigns the counter values unique to an address in units of a block in the memory to which the first data piece is to be written to, and unique to a command value of the upper counter value and the lower counter value.

* * * * *